US012712092B2

(12) United States Patent
Jacobson et al.

(10) Patent No.: US 12,712,092 B2
(45) **Date of Patent: *Aug. 18, 2026**

(54) SYSTEMS AND METHODS EMPLOYING INTERCHANGEABLE ION BEAM TARGETS

(71) Applicant: Shine Technologies, LLC, Janesville, WI (US)

(72) Inventors: Lucas Jacobson, Madison, WI (US); Tye Gribb, Madison, WI (US); Ross Radel, Madison, WI (US); Evan Sengbusch, Madison, WI (US); Preston Barrows, Madison, WI (US); Eli Moll, Madison, WI (US)

(73) Assignee: SHINE Technologies, LLC, Janesville, WI (US)

( * ) Notice: Subject to any disclaimer, the term of this patent is extended or adjusted under 35 U.S.C. 154(b) by 591 days.

This patent is subject to a terminal disclaimer.

(21) Appl. No.: 18/082,909

(22) Filed: Dec. 16, 2022

(65) Prior Publication Data

US 2023/0326622 A1 Oct. 12, 2023

Related U.S. Application Data

(63) Continuation of application No. 16/915,510, filed on Jun. 29, 2020, now Pat. No. 11,610,697.

(Continued)

(51) Int. Cl.
*G21K 1/02* (2006.01)
*G01N 23/02* (2006.01)

(Continued)

(52) U.S. Cl.
CPC ............ *G21G 4/02* (2013.01); *G01N 23/025* (2013.01); *G01T 1/12* (2013.01); *G21K 1/02* (2013.01); *H05H 3/06* (2013.01)

(58) Field of Classification Search
None
See application file for complete search history.

(56) References Cited

U.S. PATENT DOCUMENTS 2,769,096 A 10/1956 Frey
3,287,592 A 11/1966 Hirschfield et al.

(Continued)

FOREIGN PATENT DOCUMENTS

JP 2001216934 A * 8/2001
JP 2001-517298 10/2001
WO WO 2021/003107 1/2021

OTHER PUBLICATIONS

Nishiyama et al., Development of calorimetry methodology for beam current measurement of the Linear IFMIF Prototype Accelerator (LIPAc), Fusion Engineering and Design 126, (Nov. 17, 2017), https://www.sciencedirect.com/science/article/pii/S0920379617308736 (Year: 2017).*

(Continued)

*Primary Examiner* — James Choi
(74) *Attorney, Agent, or Firm* — Casimir Jones, S.C.; Brian F. Bradley

(57) ABSTRACT

Provided herein are systems and methods for generating a plurality of different monoenergetic neutron energies using a plurality of interchangeable ion beam targets. In certain embodiments, each of the plurality of ion beam targets is configured to generate a monoenergetic energy value that is at least 100 kiloelectron volts (keV) different from the other ion beam targets. In some embodiments, the ion beam targets are composed of LiF, $TiD_{1.5-1.8}$, $TiT_{1-2}$, $ErD_{1.5}$, ErT, or Li.

22 Claims, 26 Drawing Sheets

Related U.S. Application Data

(60) Provisional application No. 62/869,337, filed on Jul. 1, 2019.

(51) Int. Cl.

| | |
|---|---|
| ***G01T 1/12*** | (2006.01) |
| ***G21G 4/02*** | (2006.01) |
| ***H05H 3/06*** | (2006.01) |

(56) References Cited

U.S. PATENT DOCUMENTS

| | | | | |
|---|---|---|---|---|
| 4,818,468 | A | 4/1989 | Jungeman | |
| 5,818,054 | A | 10/1998 | Randers-Pehrson et al. | |
| 5,870,447 | A | 2/1999 | Powell et al. | |
| 6,144,032 | A | 11/2000 | Gazdinski | |
| 2004/0000637 | A1 | 1/2004 | Wieland | |
| 2005/0069076 | A1 | 3/2005 | Bricault | |
| 2008/0267356 | A1* | 10/2008 | Johnsen | G21K 1/046 378/152 |
| 2009/0074148 | A1 | 3/2009 | Echner | |
| 2009/0250623 | A1 | 10/2009 | Choi | |
| 2014/0200448 | A1* | 7/2014 | Schulte | A61N 5/1048 600/436 |
| 2015/0192530 | A1 | 7/2015 | Masuda | |
| 2017/0062086 | A1 | 3/2017 | Park et al. | |
| 2017/0223815 | A1 | 8/2017 | Yamamoto | |

OTHER PUBLICATIONS

International Search Report of related PCT/US2020/040150, mailed Dec. 29, 2020, 16 pages.

Tessler et al. “Neutron Energy Spectra and Yields from the 7Li (p; n) Reaction for Nuclear Astrophysics” 2016 J. Phys.: Conf. Ser. 665 012027. 5 pages.

Assadi, Saeed, et al. “Nonlinear beam dynamics studies of high-intensity, high-brightness proton drivers” Proc. IPAC2013, Pasadena. 2013.

Weissman, L. et al. “The use of a commercial copper beam dump for intense meV proton beams” Journal of Instrumentation 6.03 (2011): T03001.

* cited by examiner

Beam Dump inserted

Beam Dump retracted 300 keV | p-LiF | 2cm from target

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 0.2 | 2.0829 | 2.0764 | 3.57e+08 | 6.98e+06 | 0.047 | 0.088 | 72.6 | 7.35e-05 | 9.51e+07 | 0.93 | 2.00 |
| 0.3 | 2.0829 | 2.0732 | 5.33e+08 | 1.05e+07 | 0.050 | 0.090 | 72.7 | 1.10e-04 | 9.55e+07 | 0.93 | 2.02 |
| 0.5 | 2.0829 | 2.0567 | 8.84e+08 | 1.74e+07 | 0.049 | 0.093 | 72.7 | 1.82e-04 | 9.59e+07 | 0.93 | 2.04 |
| 0.7 | 2.0829 | 2.0501 | 1.23e+09 | 2.44e+07 | 0.052 | 0.098 | 72.8 | 2.54e-04 | 9.61e+07 | 0.94 | 2.08 |
| 1.0 | 2.0829 | 2.0503 | 1.74e+09 | 3.52e+07 | 0.056 | 0.107 | 73.4 | 3.64e-04 | 9.67e+07 | 0.96 | 2.14 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 0.3 | 2.1794 | 2.1700 | 7.95e+08 | 1.98e+07 | 0.051 | 0.095 | 78.6 | 3.65e-04 | 5.44e+07 | 1.28 | 2.56 |
| 0.5 | 2.1794 | 2.1637 | 1.31e+09 | 3.22e+07 | 0.050 | 0.097 | 78.3 | 5.81e-04 | 5.54e+07 | 1.25 | 2.49 |
| 0.7 | 2.1794 | 2.1574 | 1.82e+09 | 4.39e+07 | 0.053 | 0.101 | 78.2 | 7.77e-04 | 5.65e+07 | 1.23 | 2.43 |
| 1.0 | 2.1794 | 2.1479 | 2.55e+09 | 6.03e+07 | 0.056 | 0.106 | 78.0 | 1.04e-03 | 5.81e+07 | 1.19 | 2.36 |
| 1. | 2.1794 | 2.1320 | 3.69e+09 | 8.47e+07 | 0.066 | 0.122 | 78.2 | 1.39e-03 | 6.11e+07 | 1.15 | 2.27 |

500 keV I p-LiF I 2cm from target

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 0.5 | 2.2792 | 2.2640 | 1.73e+09 | 7.59e+07 | 0.050 | 0.100 | 83.7 | 1.89e-03 | 4.02e+07 | 2.73 | 8.03 |
| 0.7 | 2.2792 | 2.2579 | 2.45e+09 | 1.06e+08 | 0.052 | 0.104 | 83.8 | 2.61e-03 | 4.05e+07 | 2.69 | 7.74 |
| 1.0 | 2.2792 | 2.2488 | 3.52e+09 | 1.50e+08 | 0.055 | 0.110 | 83.8 | 3.65e-03 | 4.10e+07 | 2.62 | 7.35 |
| 1.5 | 2.2792 | 2.2334 | 5.30e+09 | 2.18e+08 | 0.064 | 0.123 | 84.3 | 5.19e-03 | 4.20e+07 | 2.50 | 6.74 |
| 2.0 | 2.2792 | 2.2180 | 6.98e+09 | 2.78e+08 | 0.075 | 0.138 | 84.8 | 6.48e-03 | 4.28e+07 | 2.38 | 6.20 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 1.5 | 2.8005 | 2.7613 | 2.66e+09 | 9.06e+07 | 0.076 | 0.152 | 79.0 | 1.06e-02 | 8.53e+06 | 1.94 | 4.41 |
| 2.0 | 2.8005 | 2.7481 | 3.55e+09 | 1.21e+08 | 0.081 | 0.160 | 79.2 | 1.40e-02 | 8.62e+06 | 1.94 | 4.41 |
| 3.0 | 2.8005 | 2.7217 | 5.32e+09 | 1.81e+08 | 0.098 | 0.180 | 79.8 | 2.06e-02 | 8.80e+06 | 1.95 | 4.42 |
| 5.0 | 2.8005 | 2.6682 | 8.88e+09 | 3.06e+08 | 0.138 | 0.229 | 81.1 | 3.31e-02 | 9.26e+06 | 1.98 | 4.53 |
| 7.0 | 2.8005 | 2.6138 | 1.25e+10 | 4.39e+08 | 0.188 | 0.285 | 82.5 | 4.47e-02 | 9.83e+06 | 2.04 | 4.73 |

2.5 MeV | P-LiF | 2cm from target

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 5.0 | 4.4228 | 4.3301 | 1.03e+10 | 2.88e+08 | 0.153 | 0.292 | 80.1 | 1.13e-01 | 2.54e+06 | 1.73 | 1.77 |
| 7.0 | 4.4228 | 4.2926 | 1.42e+10 | 3.98e+08 | 0.171 | 0.319 | 80.3 | 1.57e-01 | 2.54e+06 | 1.72 | 1.79 |
| 10.0 | 4.4228 | 4.2358 | 2.00e+10 | 5.60e+08 | 0.207 | 0.364 | 80.6 | 2.20e-01 | 2.54e+06 | 1.71 | 1.81 |
| 15.0 | 4.4228 | 4.1399 | 2.96e+10 | 8.20e+08 | 0.291 | 0.467 | 81.5 | 3.21e-01 | 2.56e+06 | 1.68 | 1.84 |
| 20.0 | 4.4228 | 4.0424 | 3.88e+10 | 1.07e+09 | 0.384 | 0.860 | 91.0 | 4.15e-01 | 2.59e+06 | 1.65 | 1.88 |

FIG. 13

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 7.5 | 5.9540 | 5.8438 | 1.69e+10 | 4.03e+08 | 0.192 | 0.388 | 62.9 | 2.35e-01 | 1.71e+06 | 1.35 | 1.35 |
| 10.0 | 5.9540 | 5.8067 | 2.26e+10 | 5.41e+08 | 0.207 | 0.412 | 63.5 | 3.15e-01 | 1.72e+06 | 1.36 | 1.35 |
| 15.0 | 5.9540 | 5.7319 | 3.43e+10 | 8.25e+08 | 0.247 | 0.774 | 79.2 | 4.75e-01 | 1.74e+06 | 1.37 | 1.36 |
| 20.0 | 5.9540 | 5.6563 | 4.64e+10 | 1.12e+09 | 0.297 | 0.828 | 79.8 | 6.37e-01 | 1.76e+06 | 1.38 | 1.36 |
| 30.0 | 5.9540 | 5.5028 | 7.14e+10 | 1.74e+09 | 0.455 | 0.953 | 81.0 | 9.65e-01 | 1.81e+06 | 1.40 | 1.37 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 1.5 | 1.2268 | 1.0758 | 1.35e+09 | 5.31e+07 | 0.238 | 0.485 | 92.1 | 1.39e-02 | 3.83e+06 | 2.92 | 1.75 |
| 2.0 | 1.2268 | 1.0225 | 1.79e+09 | 7.02e+07 | 0.277 | 0.527 | 92.5 | 1.84e-02 | 3.81e+06 | 2.90 | 1.74 |
| 3.0 | 1.2268 | 0.9107 | 2.66e+09 | 1.03e+08 | 0.382 | 0.624 | 93.1 | 2.73e-02 | 3.78e+06 | 2.86 | 1.72 |
| 5.0 | 1.2268 | 0.6570 | 4.30e+09 | 1.62e+08 | 0.638 | 0.869 | 94.0 | 4.40e-02 | 3.67e+06 | 2.76 | 1.68 |
| 7.0 | 1.2268 | 0.3290 | 5.65e+09 | 2.05e+08 | 0.795 | 1.205 | 94.6 | 5.77e-02 | 3.55e+06 | 2.63 | 1.63 |

| Target thickness [µm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 2.0 | 3.3312 | 3.2238 | 3.08e+09 | 1.17e+08 | 0.262 | 0.684 | 76.7 | 3.48e-02 | 3.36e+06 | 2.44 | 1.72 |
| 3.0 | 3.3312 | 3.1693 | 4.55e+09 | 1.74e+08 | 0.293 | 0.729 | 77.7 | 5.13e-02 | 3.39e+06 | 2.47 | 1.73 |
| 5.0 | 3.3312 | 3.0582 | 7.35e+09 | 2.85e+08 | 0.363 | 0.816 | 79.4 | 8.28e-02 | 3.44e+06 | 2.53 | 1.75 |
| 7.0 | 3.3312 | 2.9446 | 9.99e+09 | 3.93e+08 | 0.446 | 0.911 | 81.0 | 1.12e-01 | 3.50e+06 | 2.59 | 1.76 |
| 10.0 | 3.3312 | 2.7685 | 1.37e+09 | 5.49e+08 | 0.597 | 1.068 | 83.3 | 1.54e-01 | 3.57e+06 | 2.67 | 1.79 |

| Target thickness [μm] | Incoming ion energy [MeV] | Outgoing ion energy [MeV] | Total neutron source [n/s] | Neutron flux [$n/cm^2$-s] | Full width half max [MeV] | Full width 10% max [MeV] | Peak fraction | Gamma dose rate (Si) [rad/s] | N/G ratio [$n/cm^2$-mrad] | 0° flux/ 90° flux | 0° flux/ 180° flux |
|---|---|---|---|---|---|---|---|---|---|---|---|
| 3.0 | 0.4863 | 0.1000 | 1.33e+09 | 2.31e+07 | 0.290 | 0.568 | 88.1 | 2.88e-02 | 8.02e+05 | 0.86 | 1.07 |
| 5.0 | 0.6927 | 0.1000 | 5.86e+09 | 1.03e+08 | 0.340 | 0.701 | 87.5 | 1.25e-01 | 8.20e+05 | 0.86 | 1.09 |
| 7.0 | 0.8724 | 0.1000 | 1.15e+10 | 2.02e+08 | 0.469 | 0.872 | 87.3 | 2.40e-01 | 8.41e+05 | 0.87 | 1.10 |
| 10.0 | 1.1093 | 0.1000 | 2.12e+10 | 3.75e+08 | 0.693 | 1.131 | 86.5 | 4.31e-01 | 8.71e+05 | 0.87 | 1.11 |
| 15.0 | 1.4495 | 0.1000 | 3.03e+10 | 5.35e+08 | 0.839 | 1.513 | 81.2 | 5.96e-01 | 8.98e+05 | 0.87 | 1.10 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 0.2 | 2.0829 | 2.0764 | 3.57e+08 | 3.21e+04 | 0.037 | 0.061 | 72.2 | 3.16e-07 | 1.02e+08 | 1.05 | 1.91 |
| 0.3 | 2.0829 | 2.0732 | 5.33e+08 | 4.81e+04 | 0.037 | 0.063 | 72.2 | 4.70e-07 | 1.02e+08 | 1.05 | 1.92 |
| 0.5 | 2.0829 | 2.0667 | 8.84e+08 | 8.00e+04 | 0.039 | 0.066 | 72.1 | 7.74e-07 | 1.03e+08 | 1.06 | 1.95 |
| 0.7 | 2.0829 | 2.0601 | 1.23e+09 | 1.12e+05 | 0.040 | 0.071 | 72.2 | 1.08e-06 | 1.04e+08 | 1.07 | 1.98 |
| 1.0 | 2.0829 | 2.0503 | 1.74e+09 | 1.62e+05 | 0.045 | 0.080 | 72.7 | 1.52e-06 | 1.06e+08 | 1.09 | 2.04 |

| Target thickness [µm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 0.3 | 2.1794 | 2.1700 | 7.95e+08 | 9.24e+04 | 0.042 | 0.067 | 79.0 | 1.75e-06 | 5.28e+07 | 1.47 | 2.47 |
| 0.5 | 2.1794 | 2.1637 | 1.31e+09 | 1.50e+05 | 0.042 | 0.071 | 78.8 | 2.78e-06 | 5.39e+07 | 1.44 | 2.40 |
| 0.7 | 2.1794 | 2.1574 | 1.82e+09 | 2.04e+05 | 0.043 | 0.074 | 78.5 | 3.72e-06 | 5.49e+07 | 1.41 | 2.35 |
| 1.0 | 2.1794 | 2.1479 | 2.55e+09 | 2.81e+05 | 0.046 | 0.081 | 78.4 | 4.96e-06 | 5.65e+07 | 1.37 | 2.28 |
| 1.5 | 2.1794 | 2.1320 | 3.69e+09 | 3.94e+05 | 0.055 | 0.095 | 78.3 | 6.60e-06 | 5.97e+07 | 1.32 | 2.19 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 0.5 | 2.2792 | 2.2640 | 1.73e+09 | 3.62e+05 | 0.046 | 0.075 | 84.7 | 9.03e-06 | 4.01e+07 | 3.24 | 7.66 |
| 0.7 | 2.2792 | 2.2579 | 2.45e+09 | 5.05e+05 | 0.047 | 0.078 | 84.7 | 1.25e-05 | 4.04e+07 | 3.18 | 7.40 |
| 1.0 | 2.2792 | 2.2488 | 3.52e+09 | 7.15e+05 | 0.048 | 0.084 | 84.6 | 1.74e-05 | 4.10e+07 | 3.10 | 7.04 |
| 1.5 | 2.2792 | 2.2334 | 5.30e+09 | 1.04e+06 | 0.055 | 0.096 | 84.8 | 2.48e-05 | 4.19e+07 | 2.96 | 6.49 |
| 2.0 | 2.2792 | 2.2180 | 6.98e+09 | 1.33e+06 | 0.067 | 0.112 | 85.2 | 3.10e-05 | 4.28e+07 | 2.82 | 5.97 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 1.5 | 2.8005 | 2.7613 | 2.66e+09 | 4.30e+05 | 0.068 | 0.113 | 79.9 | 5.02e-05 | 8.56e+06 | 2.28 | 4.30 |
| 2.0 | 2.8005 | 2.7481 | 3.55e+09 | 5.73e+05 | 0.071 | 0.121 | 80.0 | 6.63e-05 | 8.64e+06 | 2.28 | 4.29 |
| 3.0 | 2.8005 | 2.7217 | 5.32e+09 | 8.59e+05 | 0.085 | 0.144 | 80.6 | 9.76e-05 | 8.81e+06 | 2.28 | 4.30 |
| 5.0 | 2.8005 | 2.6682 | 8.88e+09 | 1.45e+06 | 0.137 | 0.198 | 82.0 | 1.57e-04 | 9.27e+06 | 2.33 | 4.41 |
| 7.0 | 2.8005 | 2.6138 | 1.25e+10 | 2.08e+06 | 0.189 | 0.254 | 83.3 | 2.11e-04 | 9.85e+06 | 2.40 | 4.61 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$·mrad] | 0° flux/ 90° flux | 0° flux/ 180° flux |
|---|---|---|---|---|---|---|---|---|---|---|---|
| 5.0 | 4.4228 | 4.3301 | 1.03e+10 | 1.36e+06 | 0.131 | 0.219 | 80.6 | 5.32e-04 | 2.56e+06 | 2.03 | 1.74 |
| 7.0 | 4.4228 | 4.2926 | 1.42e+10 | 1.88e+06 | 0.144 | 0.248 | 80.8 | 7.37e-04 | 2.55e+06 | 2.02 | 1.76 |
| 10.0 | 4.4228 | 4.2358 | 2.00e+10 | 2.64e+06 | 0.189 | 0.301 | 81.3 | 1.03e-03 | 2.56e+06 | 2.00 | 1.78 |
| 15.0 | 4.4228 | 4.1399 | 2.96e+10 | 3.87e+06 | 0.282 | 0.395 | 81.7 | 1.51e-03 | 2.57e+06 | 1.96 | 1.81 |
| 20.0 | 4.4228 | 4.0424 | 3.88e+10 | 5.07e+06 | 0.376 | 0.849 | 92.0 | 1.95e-03 | 2.60e+06 | 1.93 | 1.85 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 7.5 | 5.9540 | 5.8438 | 1.69e+10 | 1.93e+06 | 0.183 | 0.295 | 64.0 | 1.10e-03 | 1.75e+06 | 1.59 | 1.36 |
| 10.0 | 5.9540 | 5.8067 | 2.26e+10 | 2.60e+06 | 0.184 | 0.318 | 64.5 | 1.48e-03 | 1.76e+06 | 1.60 | 1.37 |
| 15.0 | 5.9540 | 5.7319 | 3.43e+10 | 3.96e+06 | 0.223 | 0.382 | 65.7 | 2.23e-03 | 1.78e+06 | 1.62 | 1.37 |
| 20.0 | 5.9540 | 5.6563 | 4.64e+10 | 5.38e+06 | 0.289 | 0.808 | 81.4 | 2.99e-03 | 1.80e+06 | 1.63 | 1.38 |
| 30.0 | 5.9540 | 5.5028 | 7.14e+10 | 8.36e+06 | 0.449 | 0.939 | 82.4 | 4.53e-03 | 1.85e+06 | 1.66 | 1.39 |

| Target thickness [μm] | Incoming ion energy [MeV] | Outgoing ion energy [MeV] | Total neutron source [n/s] | Neutron flux [n/cm²-s] | Full width half max [MeV] | Full width 10% max [MeV] | Peak fraction | Gamma dose rate (Si) [rad/s] | N/G ratio [n/cm²-mrad] | 0° flux/ 90° flux | 0° flux/ 180° flux |
|---|---|---|---|---|---|---|---|---|---|---|---|
| 1.5 | 1.2268 | 1.0758 | 1.35e+09 | 2.64e+05 | 0.234 | 0.387 | 93.5 | 6.48e-05 | 4.06e+06 | 3.58 | 1.79 |
| 2.0 | 1.2268 | 1.0225 | 1.79e+09 | 3.48e+05 | 0.252 | 0.428 | 93.5 | 8.60e-05 | 4.05e+06 | 3.55 | 1.78 |
| 3.0 | 1.2268 | 0.0107 | 2.66e+09 | 5.10e+05 | 0.355 | 0.539 | 94.1 | 1.28e-04 | 4.00e+06 | 3.50 | 1.76 |
| 5.0 | 1.2268 | 0.6570 | 4.30e+09 | 7.99e+05 | 0.609 | 0.804 | 94.8 | 2.06e-04 | 3.88e+06 | 3.37 | 1.71 |
| 7.0 | 1.2268 | 0.3290 | 5.65e+09 | 1.01e+06 | 0.703 | 1.179 | 95.5 | 2.70e-04 | 3.74e+06 | 3.20 | 1.66 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 2.0 | 3.3312 | 3.2238 | 3.08e+09 | 5.89e+05 | 0.361 | 0.628 | 81.0 | 1.62e-04 | 3.63e+06 | 3.03 | 1.79 |
| 3.0 | 3.3312 | 3.1693 | 4.55e+09 | 8.77e+05 | 0.391 | 0.657 | 81.6 | 2.39e-04 | 3.66e+06 | 3.06 | 1.80 |
| 5.0 | 3.3312 | 3.0582 | 7.35e+09 | 1.44e+06 | 0.420 | 0.726 | 82.8 | 3.87e-04 | 3.72e+06 | 3.14 | 1.81 |
| 7.0 | 3.3312 | 2.9446 | 9.99e+09 | 1.99e+06 | 0.463 | 0.802 | 83.8 | 5.25e-04 | 3.79e+06 | 3.22 | 1.83 |
| 10.0 | 3.3312 | 2.7685 | 1.37e+10 | 2.78e+06 | 0.576 | 0.943 | 85.4 | 7.18e-04 | 3.87e+06 | 3.33 | 1.85 |

| Target thickness [μm] | Incoming ion energy [MeV] | Outgoing ion energy [MeV] | Total neutron source [n/s] | Neutron flux [n/cm$^2$-s] | Full width half max [MeV] | Full width 10% max [MeV] | Peak fraction | Gamma dose rate (Si) [rad/s] | N/G ratio [n/cm$^2$-mrad] | 0° flux/ 90° flux | 0° flux/ 180° flux |
|---|---|---|---|---|---|---|---|---|---|---|---|
| 3.0 | 0.4863 | 0.1000 | 1.33e+09 | 1.08e+05 | 0.227 | 0.531 | 88.5 | 1.35e-04 | 7.97e+05 | 0.97 | 1.05 |
| 5.0 | 0.6927 | 0.1000 | 5.86e+09 | 4.79e+05 | 0.268 | 0.645 | 87.5 | 5.88e-04 | 8.15e+05 | 0.98 | 1.07 |
| 7.0 | 0.8724 | 0.1000 | 1.15e+10 | 9.41e+05 | 0.452 | 0.855 | 88.4 | 1.13e-03 | 8.36e+05 | 0.99 | 1.08 |
| 10.0 | 1.1093 | 0.1000 | 2.12e+10 | 1.75e+06 | 0.633 | 1.068 | 87.0 | 2.02e-03 | 8.67e+05 | 0.99 | 1.09 |
| 15.0 | 1.4495 | 0.1000 | 3.03e+10 | 2.49e+06 | 0.766 | 1.473 | 81.9 | 2.79e-03 | 8.94e+05 | 0.99 | 1.08 |

SYSTEMS AND METHODS EMPLOYING INTERCHANGEABLE ION BEAM TARGETS

The present application is a continuation of U.S. patent application Ser. No. 16/915,510, filed Jun. 29, 2020, which claims priority to U.S. provisional application Ser. No. 62/869,337, filed Jul. 1, 2019, which are herein incorporated by reference in their entireties.

FIELD

Provided herein are systems and methods for generating a plurality of different monoenergetic neutron energies using a plurality of interchangeable ion beam targets. In certain embodiments, each of the plurality of ion beam targets is configured to generate a monoenergetic energy value that is at least 100 kiloelectron volts (keV) different from the other ion beam targets. In some embodiments, the ion beam targets are composed of LiF, $TiD_{1.5-1.8}$, $TiT_{1-2}$, $ErD_{1.5}$, ErT, or Li.

BACKGROUND

Neutron radiography and tomography are proven techniques for the nondestructive testing and quality control of manufactured components in the aerospace, energy, automotive, defense, and other sectors. Like X-rays, when neutrons pass through an object, they provide information about the internal structure of that object. Neutrons are able to easily pass through many high density materials and provide detailed information about internal materials, including many low density materials. This property is extremely important for a number of components that require nondestructive evaluation including jet engine turbine blades, satellite components, munitions, aircraft and spacecraft components, and composite materials.

SUMMARY

Provided herein are systems and methods for generating a plurality of different monoenergetic neutron energies using a plurality of interchangeable ion beam targets. In certain embodiments, each of the plurality of ion beam targets is configured to generate a monoenergetic energy value that is at least 100 kiloelectron volts (keV) different (or 10-90 keV different) from the other ion beam targets. In some embodiments, the ion beam targets are composed of LiF, $TiD_{1.5-1.8}$, $TiT_{1-2}$, $ErD_{1.5}$, ErT, or Li.

In some embodiments, provided herein are systems for generating a plurality of monoenergetic neutron energies comprising: a) an ion source configured to produce an ion beam; b) an accelerator operatively coupled to the ion source and configured to receive the ion beam and accelerate the ion beam to generate an accelerated ion beam; c) a target station comprising a target holding mechanism; and d) a plurality of interchangeable ion beam targets, wherein each of the interchangeable ion beam targets: i) is configured to be held by the target holding mechanism, and ii) generates neutrons with a monoenergetic neutron energy value unique among the plurality of interchangeable ion beam targets when struck with the accelerated ion beam, and wherein collectively the plurality of interchangeable ion beam targets, when struck with the accelerated ion beam, provide neutrons with a range of monoenergetic neutron energy values that spans at least 300 kiloelectron volts (keV) (or span at least 150-250 keV).

In certain embodiments, each of interchangeable the ion beam targets comprises, consists of, or consists essentially of: LiF, $TiD_{1.5-1.8}$, $TiT_{1-2}$, $ErD_{1.5}$, ErT, and/or Li. In other embodiments, each of the interchangeable ion beam targets: iii) has a thickness unique among the plurality of ion beam targets. In further embodiments, collectively the plurality of interchangeable ion beam targets provide neutrons with a range of monoenergetic neutron energy values that spans at least one mega-electron-volt (MeV) (e.g., at least 1 . . . 1.5 . . . 2.0 . . . 4.5 . . . 7.0 . . . or 9.0 MeV). In particular embodiments, collectively the plurality of interchangeable ion beam targets provide neutrons with a range of monoenergetic neutron energy values that spans at least ten mega-electron-volts (e.g., at least 10 . . . 12 . . . 15 . . . or 20 mega-electron volts).

In certain embodiments, the monoenergetic neutron energy of each of the plurality of interchangeable ion beam targets is at least 100 keV different from each other (e.g., at least 100 . . . 200 . . . 400 . . . 800 . . . or 2000 keV). In further embodiments, the monoenergetic neutron energy of each of the plurality of interchangeable ion beam targets is at least 500 keV different from each other. In some embodiments, the plurality of interchangeable ion beam targets comprises at least three ion beam targets (e.g., at least 3, 4, 5, 6, 7, 8, or 9). In other embodiments, the plurality of interchangeable ion beam targets comprises at least six ion beam targets (e.g., at least 6, 7, 8, 9, 10, 11, 12, 13, 14, or 15). In certain embodiments, the plurality of interchangeable ion beam targets comprises: i) a first ion beam target that generates a monoenergetic neutron energy value of about 300 keV; ii) a second ion beam target that generates a monoenergetic neutron energy value of about 1 MeV; iii) a third ion beam target that generates a monoenergetic neutron energy value of about 2.5 MeV; iv) a fourth ion beam target that generates a monoenergetic neutron energy value of about 4 MeV; v) a fifth ion beam target that generates a monoenergetic neutron energy value of about 6 MeV; and vi) a sixth ion beam target that generates a monoenergetic neutron energy value of about 14 MeV. In some embodiments, monoenergetic neutron energy values between the previously recited values are employed (e.g., 700 keV, 2.3 MeV, 3.1 MeV, 5.2 MeV, and 12.3 MeV).

In some embodiments, the systems further comprise a control system, wherein the control system comprises software configured to alter the incoming ion energy of the accelerated ion beam based on which of the plurality of plurality of interchangeable ion beam targets are held by the target holding mechanism. In other embodiments, the systems further comprise a testing facility configured to scan an item with the neutrons. In certain embodiments, the item is selected from the group consisting of: a space system, space equipment, airplane component, infrastructure, and a component of a transportation system. In particular embodiments, the systems further comprise a collimator. In other embodiments, the target station further comprises a water cooling system.

In some embodiments, provided herein are methods comprising: a) inserting a first target, from a set of at least two ion beam targets, into an ion beam accelerator that generates an accelerated ion beam; b) activating the ion beam accelerator for a length of time such than an accelerated ion beam strikes the first target, thereby generating neutrons with a first monoenergetic neutron energy value; c) removing the first target from the ion beam accelerator; d) inserting a second target, from the set of at least two targets, into the ion beam accelerator; and e) activating the ion beam accelerator for a length of time (and at a certain energy) such than an ion beam strikes the second target, thereby generating neutrons with a second monoenergetic neutron energy value that is at least 100 kiloelectron volts (keV) different from the first monoenergetic neutron energy value. In other embodiments, the second monoenergetic neutron energy value is at last 500 kiloelectron volts (keV) different from the first monoenergetic neutron energy value (e.g., at least 500 . . . 1000 . . . 2000 . . . 10,000 keV).

In some embodiments, the at least two ion beam targets comprise at least three ion beam targets, and the method further comprises: f) removing the second target from the ion beam accelerator; g) inserting a third target, from the set of at least three targets, into the ion beam accelerator; and h) activating the ion beam accelerator for a length of time such than an ion beam strikes the third target, thereby generating neutrons with a third monoenergetic neutron energy value that is at least 100 kiloelectron volts (keV) different from both the first and second monoenergetic neutron energy values. In further embodiments, the third monoenergetic neutron energy value is at last 500 kiloelectron volts different from the first and second monoenergetic neutron energy values.

In some embodiments, the at least three ion beam targets comprises at least four ion beam targets, and the method further comprises: i) removing the third target from the ion beam accelerator; j) inserting a fourth target, from the set of at least four targets, into the ion beam accelerator; and k) activating the ion beam accelerator for a length of time such than an ion beam strikes the fourth target, thereby generating neutrons with a fourth monoenergetic neutron energy value that is at least 100 kiloelectron volts (keV) different from all of the first, second, and third monoenergetic neutron energy values. In some embodiments, the fourth monoenergetic neutron energy value is at last 500 kiloelectron volts different from the first, second, and third monoenergetic neutron energy values. In some embodiments, the steps are repeated for a fifth, sixth, seventh or more ion beam target.

In some embodiments, each of the ion beam targets comprises, consists of, or consists essentially of: LiF, $TiT_{1-2}$, $ErD_{1.5}$, ErT, or Li. In other embodiments, each of the at least four ion beam targets has a thickness unique among the first, second, third, and fourth ion beam targets. In further embodiments, collectively the at least four ion beam targets provide neutrons with a range of monoenergetic neutron energy values that spans at least five or 10 mega-electron-volts (MeV) (e.g., at least 5 . . . 7 . . . 10 . . . 15 . . . 20 . . . or 30 MeV). In certain embodiments, the methods further comprise a step between b) and c) (or between g) and h), or between j) and k)) of using the neutrons with a first monoenergetic neutron energy value to scan an item. In some embodiments, the item is selected from the group consisting of: a space system, space equipment, airplane component, infrastructure, and a component of a transportation system. In particular embodiments, the each of the at least two, or at least three, or at least four ion beam targets generate a different monoenergetic neutron energy value selected from the group consisting of: of about 300 keV, about 1 MeV, about 2.5 MeV, about 4 MeV, about 6 MeV, and about 14 MeV.

In some embodiments, provided herein are systems comprising: a) a computer processor; b) non-transitory computer memory comprising one or more computer programs and a database, wherein said one or more computer programs comprises accelerator system operating software; and c) an ion beam accelerator system comprising one or more of the following sub-systems which are in operable communication with said non-transitory computer memory, and which can be automatically adjusted by said accelerator system operating software to account for a particular ion beam target present in said ion beam accelerator system selected from a plurality of ion beam targets: i) a target station comprising a target holding mechanism configured to hold one of said plurality of said ion beam targets; and ii) a beam generating sub-system that generates an ion beam with a strength adjusted by said accelerator system operating software based on which of said plurality of ion beam targets is present in said ion beam accelerator system.

BRIEF DESCRIPTION OF THE DRAWINGS

FIG. 3A shows a non-cut away version and FIG. 3B shows certain components in cut away.

FIG. 13 shows neutron energy spectra target modeling for 2 cm from a p-LiF target at 2.5 MeV, showing the flux to energy relationship for different target thicknesses.

DETAILED DESCRIPTION

Figure 1:
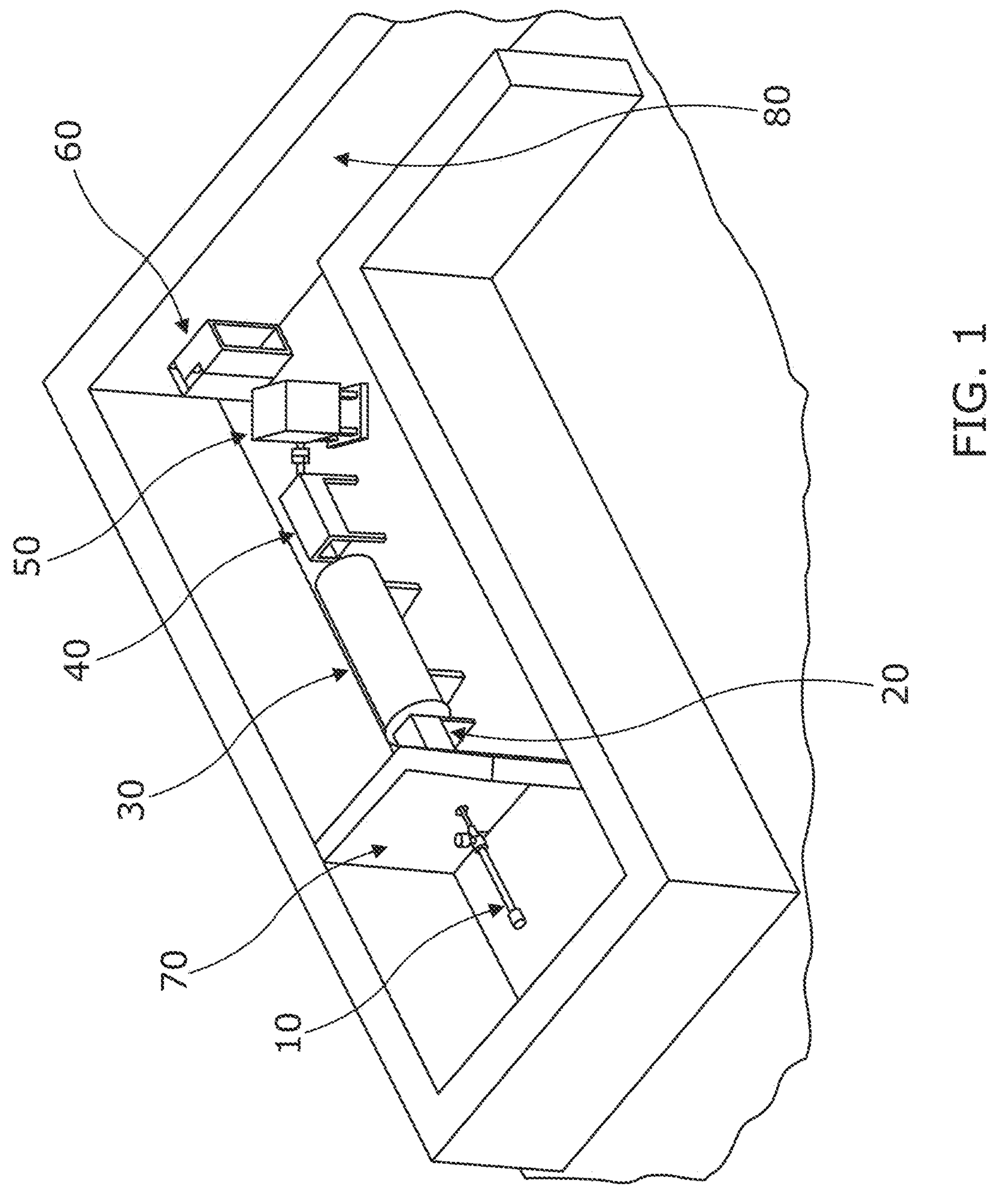
FIG. 1 shows an exemplary schematic of an accelerator system installed in a testing facility.

Provided herein are systems and methods for generating a plurality of different monoenergetic neutron energies using a plurality of interchangeable ion beam targets. In certain embodiments, each of the plurality of ion beam targets is configured to generate a monoenergetic energy value that is at least 100 kiloelectron volts (keV) different from the other ion beam targets. In some embodiments, the ion beam targets are composed of: LiF, $TiT_{1-2}$, $ErD_{1.5}$, ErT, or Li.

In certain embodiments, provided herein is a single neutron system to be used for radiation effects testing, and neutron scanning, with various neutron energies. In particular embodiments, the following systems and parts are scanned for radiation and/or internal defects including, but not limited to: space systems and equipment (e.g., satellite and satellite components), materials and components subjected to possible radiation damage, materials and components subjected to possible radiation damage, functional/electronic systems used in civil nuclear plants (e.g., equipment nuclearization), infrastructures (e.g., hardening with respect to lightning), systems that might be sensitive to the natural radiation environment (e.g., atmospheric neutrons) particularly as related to reliability (e.g. transportation means), and systems that need to handle threats from directed energy weapons (e.g., High Power Microwaves). In some embodiments, the systems and embodiments, herein allow for assessing component behavior under a plurality of different neutron irradiation values (e.g., 14 MeV, 6 MeV, 4 MeV, 2.5 MeV, 1 MeV and 300 keV neutron irradiation). Table 1 provide exemplary neutron energies with corresponding exemplary neutron flux.

TABLE 1

| Neutron Energy (+/−10%) | Neutron Flux at 2 cm from target ($n/cm^2/s$) |
|---|---|
| 300 keV | 2E8 |
| 1 MeV | 2E8 |
| 2.5 MeV | 7E8 |
| 4 MeV | 2E8 |
| 6 MeV | 2E8 |
| 14 MeV | 2E8 |

In certain embodiments, a plurality of different ion beam targets are employed which are swappable into a single accelerator system. In some embodiments, LiF targets of varying thicknesses are employed (e.g., for 300 keV, 400 keV, 500 keV, 1 MeV, 2.5 MeV and 15 MeV neutrons from Table 1). In particular embodiments, TiD1.5 targets of varying thicknesses are employed (e.g., for 4 MeV and 6 MeV neutrons from Table 1). Any type of suitable accelerator system may be employed, herein, such as the adjustable commercial tandem accelerator system provided by National Electrostatics Corporation (NEC). The performance specification for an exemplary accelerator system are shown in Table 2 below.

TABLE 2

| Performance Specifications | |
|---|---|
| Insulating Column Voltage Rating | 3.3 Megavolts |
| Voltage Stability | Better than 1 kv |
| Voltage Ripple | <=200 V rms, over entire energy range |
| Proton/Deuteron Energy Range | 0.4 to 6.0 Mev |
| Vacuum System Base Pressure (without beam) | 5e−8 Torr or better |
| Max Current | 200 uA |
| Min Current | 1 uA |
| Acceptance Current | 175 uA |

In certain embodiments, the systems herein employ a single beam line, while in other embodiments, multiple beam lines are employed in conjunction with multiple target stations. In certain embodiments, pure lithium ion beam targets are employed.

Any type of suitable ion source can be employed with the systems herein. In certain embodiments, a proton or deuteron ion source (e.g., with a Toroidal discharge chamber) is employed. In certain embodiments, the ion source power supplies and two molecular pumps (e.g., 650 l/s turbo) with isolation valve and backing pump are be biased up to, for example, −60 kV. In certain embodiments, two 4.2 kVA rating isolation transformers are employed to deliver AC power to the ion source pumps and power supplies. In some embodiments, an insulating fluid is pumped in a closed loop from ground potential to the ion source for cooling. In particular embodiments, one or more of the following system components are employed: an extractor, acceleration gap and einzel lens assembly; a pre-acceleration tube; bias isolation power supply; Y-steerer; faraday cup; and process controls and power supplies.

In certain embodiments, related to the low-energy beamline in the system, magnetic deflection is used to mass analyze ion beams from the ion sources. In some embodiments, an electrostatic X-Y steerer and an Einzel lens are provided to direct the mass analyzed beam to the accelerator stripper tube. In particular embodiments, the systems employ one or more of the following: an Inflection Magnet; Lenses, Beam Steerer; Faraday Cup; Beam Profile Monitor; and Controls.

Any type of suitable accelerator may be used with the methods and systems herein. In certain embodiments, the accelerator is a dual acceleration (tandem) electrostatic accelerator (e.g., capable of delivering energies of 0.4 to 6.0 MeV for singly charged ions). In some embodiments, four high performance charging chain systems are installed in the column to provide a conservative 600μ amps of current to the high voltage terminal. The charging chains deliver current efficiently with much less energy loss to the gas than in the case of belts. Thus, high charging current can be provided with relatively modest power input and without introduction of a difficult cooling problems. In certain embodiments, the acceleration tubes are of rugged metal and ceramic construction and are bakeable to moderate temperatures. They can be operated at pressures lower by a factor of about 100 than pressures commonly achieved in tubes sealed with organic cements. This is advantageous for high current applications where back streaming electrons from ionization of gas molecules can give a total current drain many times greater than the ion beam current. The tubes do not require inclined fields or high tube pressure to permit successful operation. In certain embodiments, the vacuum system furnished with the accelerator is composed of all metal and ceramic construction (e.g., with the exception of the ion source, turbo-molecular pumps and gate valves), and is capable of ultra-high vacuum operation. In some embodiments, the design aim of this vacuum system is between $1\times10^{-8}$ Torr and $5\times10^{-8}$ Torr when no ion beam is present. In certain embodiments, the accelerate systems comprise at least one of the following components: a tank, column, terminal, shorting rod system, charging system, voltage stabilization system, accelerating tube and vacuum system, potential distribution, and insulating gas (e.g., Sf6).

In certain embodiments, the post acceleration beam line includes components necessary to steer and focus the proton/deuteron beam into the various targets for neutron production. In some embodiments, this system feeds into a single, permanently installed target station with interchangeable target disks on a target assembly, as described further below.

Figure 3A:
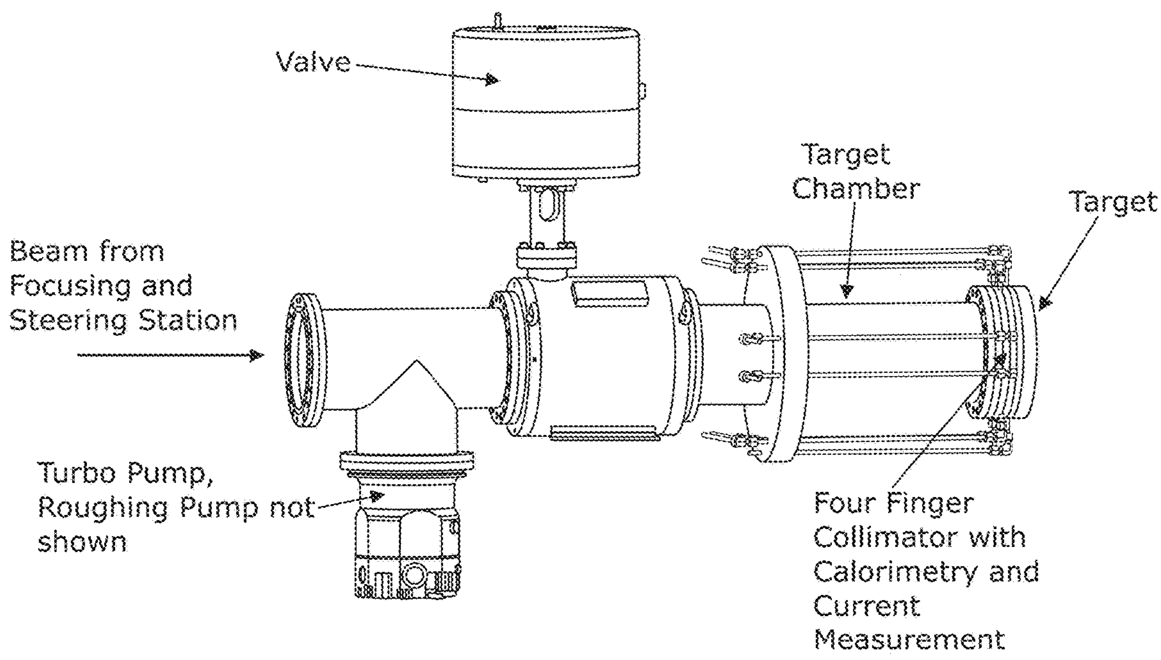
FIGS. 3A-3B show an exemplary portion of an accelerator system that includes a target station.
Figure 3B:
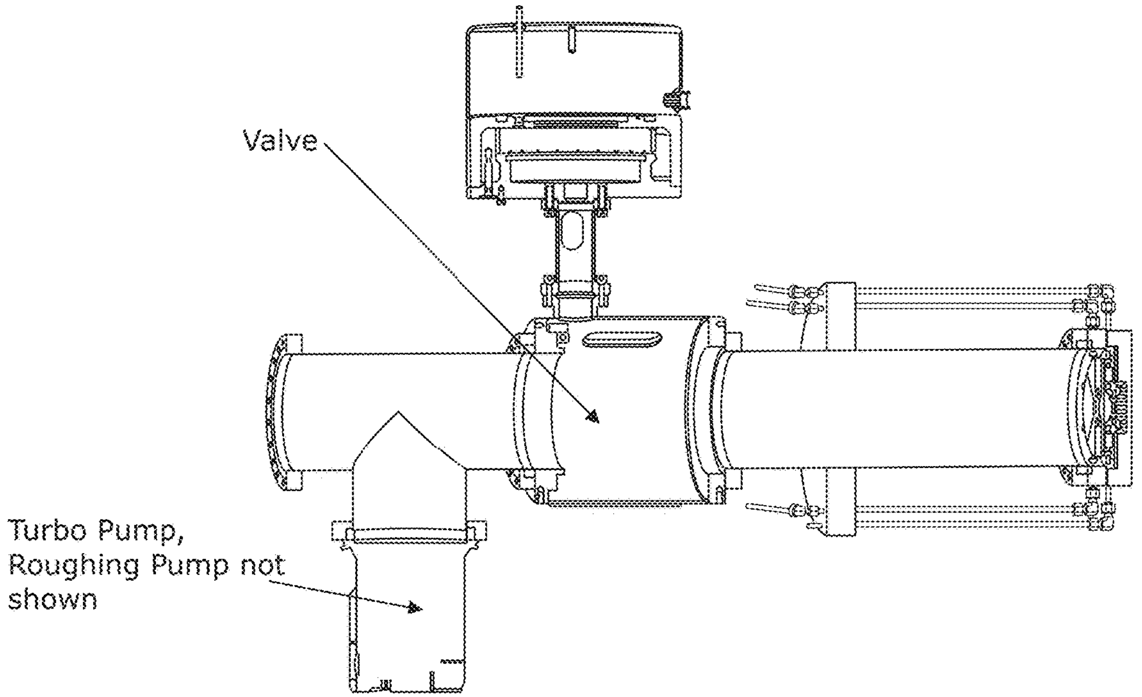
Figure 4A:
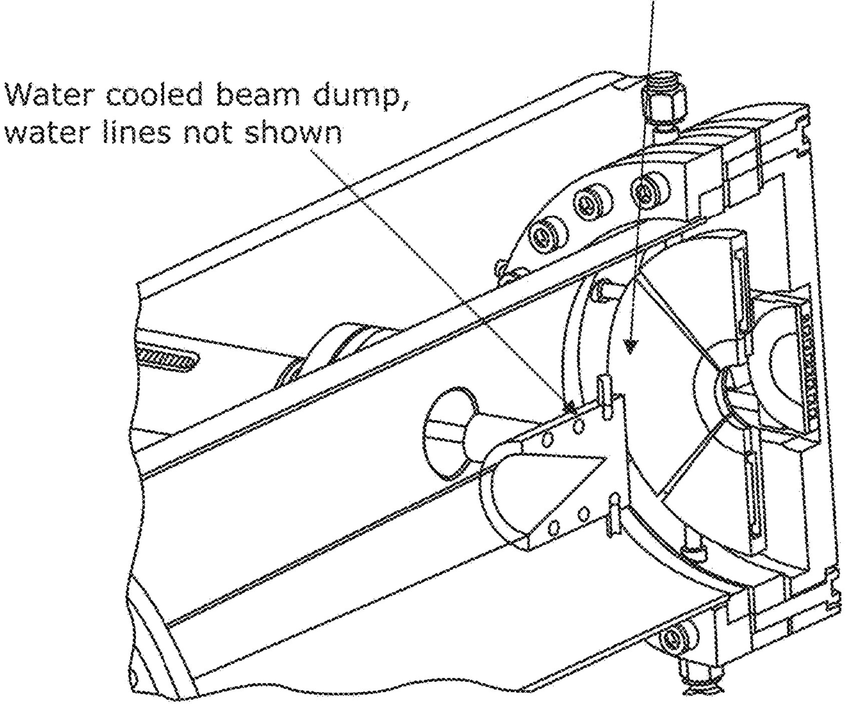
FIG. 4A shows an exemplary embodiment where a beam dump intercepts the beam line such that it cannot then strike the target.
Figure 4B:
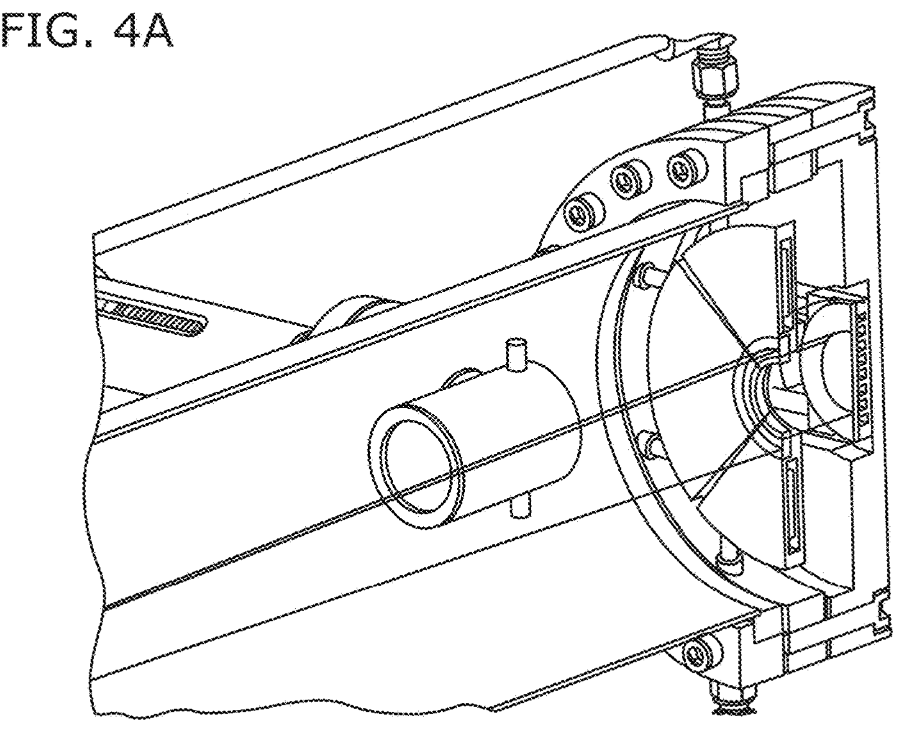
FIG. 4B shows how the Beam Dump is able to retract and allow the beam to continue to a collimator and target.

In certain embodiments, the systems and methods herein employ a target station that allow different targets to be installed therein. An exemplary target station is shown in FIG. 3 attached to a portion of an accelerator system. In certain embodiments, when not irradiating a target, the beam will encounter a beam dump controlled by an air actuated linear feedthrough as shown in FIG. 4A (e.g., 100% of the beam is collected into the Beam Dump and current is measured). In certain embodiments, the Beam Dump is able to retract and allow the beam to continue (e.g., to the four finger collimator as shown in FIG. 4B). In some embodiments, when the beam current hits the collimator (e.g., four finger collimator), it is measured and subtracted from the beam dump current measurement to calculate exact beam current on the target. As shown in FIG. 4A, the beam passes through the four finger collimator and hits the neutron producing target.

Figure 5:
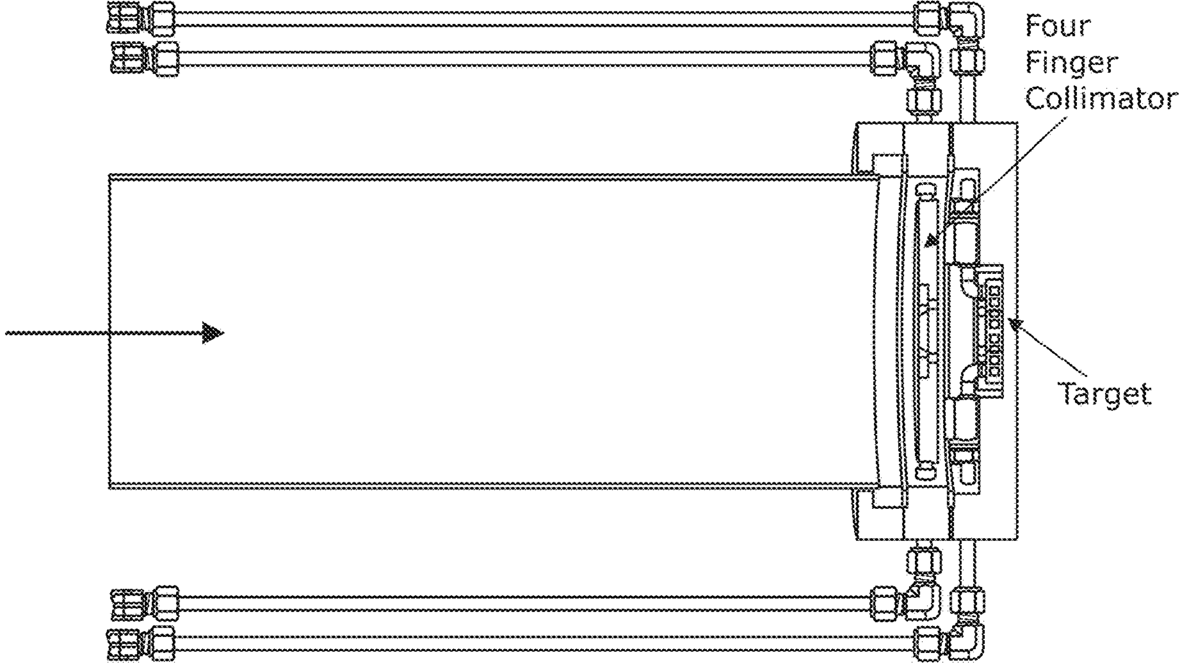
FIG. 5 shows a cut-away view of an exemplary target station.

In certain embodiments, at least one viewport is included as part of the target station to allow the target to be visualized (e.g., as shown in the cut-away view in FIG. 5). In some embodiments, target health monitoring is performed indirectly by measuring at least one of the following: using an energy-resolving planar silicon charged particle detector installed in a target holding flange, where output from this detector and an external long detector is used in concert to monitor neutron output; target chamber pressure; fast gate valve position; target coolant flow in; target coolant flow out; target coolant temperature in; target coolant temperature out; an nominal neutron flux.

Figure 6A:
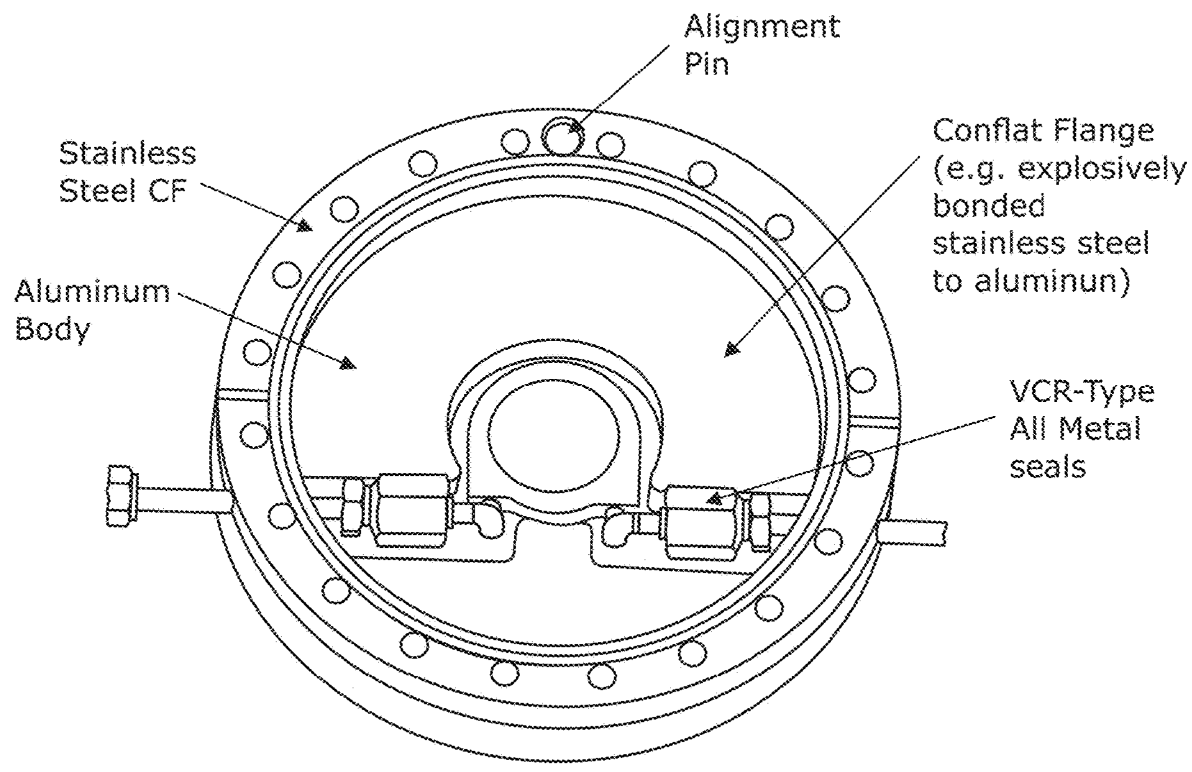
FIGS. 6A-6B show a top view (FIG. 6A) and cut-away view (FIG. 6B) of an exemplary target holding flange for use in the systems herein.
Figure 6B:
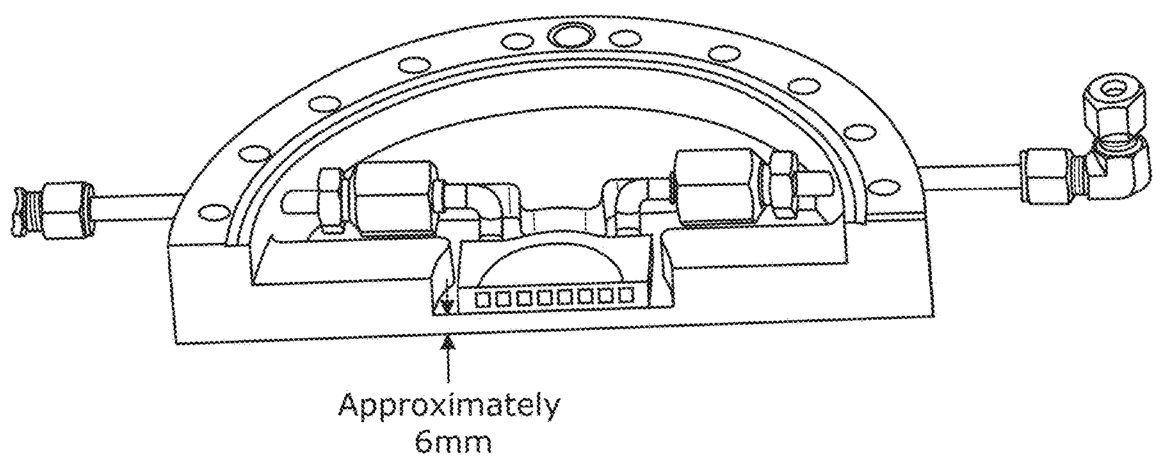

In some embodiments, the interchangeable ion beam targets herein is positioned in target holding flanges, such as shown in FIG. 6. In general, the heat load is very high on the target making it difficult to achieve sufficient and uniform cooling by mounting the target in a cooled target holder. As such, direct water cooling of the tantalum substrate containing the generally thin target material is employed in some embodiments. Two exemplary designs for the ion beam targets are as follows. First, in certain embodiments, a single integrated target assembly composed of tantalum disks with internal cooling lines is used to hold the target. The target is attached to and held rigidly in place by its water cooling lines that are vacuum coupling radiation (VCR) type fittings. The cooling water system, in certain embodiments, has features to ensure that the water is completely removed from the water lines before changing the target assembly. Second, in some embodiments, the target is composed of a thin (~3 mm) tantalum disk and ion beam target that is attached and sealed to a target holder that directly exposes the backside of the target to the cooling water. In certain embodiments, this target depends upon all metal "o-ring" seals. In this case the target holder that resides in the target holder flange is not typically replaced with a target change. However, periodic maintenance/replacement is generally employed. The distance between the LiF or TiD1.5 (or other material, such as pure lithium) target surface and the open space outside of the vacuum chamber available for component irradiation is, in certain embodiments, approximately 15 mm. Further, the outer surface of the target station where components are irradiated is, in some embodiments, flat and free or extrusions, allowing for the placement of large components directly against the irradiation surface of the target station.

In the certain embodiments, the target station design employs one beamline impinging on a single target to produce the desired reaction. The target can be swapped out with other targets for different reactions. In some embodiments, the procedure for changing employs the following steps: 1) Close a standard gate valve between the target and a fast valve that isolates the pumping station from the target area; 2) Vent the target area; 3) Remove the back target flange, the 4-finger collimator remains in place unless it is being serviced; 4) Remove the target by loosening two VCR-type nuts that attach the water-cooling lines or by removing the target disk; 5) Install new target into the back flange by tightening two VCR-type nuts; 6) Reinstall the back target flange onto the 4-finger collimator flange; 7) Open Valve to roughing pump, rough target chamber, close the valve to rough pump; and 8) Open a gate valve to the pumping stage (interlocked can only be performed when adequate pressure is achieved, and the rough pump valve is closed). In certain embodiments, the zero length flange holding the 4 finger collimator is attached by its own bolt pattern and remains firmly attached to the target chamber during normal target changes (e.g., it will only be removed when the four finger collimator needs servicing). In certain embodiments, the outer flange is a modified aluminum conflat with a stainless knife edge. In general, the majority of the time for a target change will be uninstalling and reinstalling the conflat flange that is the backing plate. In certain embodiments, the back flange is equipped with a "quick door" that has a single clamping mechanism and polymer o-ring (e.g., that would be changed regularly due to neutron damage). In certain embodiments, if a conflat seal is employed, mounting of a vertical conflat gasket is employed.

A comprehensive modeling study for the neutron energy and flux parameters provided in Table 1 above, and reproduced below, was undertaken during development of embodiments herein.

TABLE 1

| Neutron Energy (+/−10%) | Neutron Flux at 2 cm from target (n/cm$^2$/s) |
|---|---|
| 300 keV | 2E8 |
| 1 MeV | 2E8 |
| 2.5 MeV | 7E8 |
| 4 MeV | 2E8 |
| 6 MeV | 2E8 |
| 14 MeV | 2E8 |

Results of this modeling are shown in FIGS. 9-26. It is noted that pure Lithium targets may also be employed besides the LiF and TiD1.5 modeled in FIGS. 9-26. In certain embodiments, titanium with 1.5 deuterium atoms in interstitial points per titanium atom (TiD1.5) is used to maximize flux for the DD reactions. In many cases, there is an inherent tradeoff between a narrower energy band and higher neutron flux and vise versa. For many reactions, the modeling work has shown different target thickness options to demonstrate that tradeoff. Other target thicknesses are also possible depending on the prioritization of energy spectrum versus total flux. In this exemplary modeling, all reactions have a beam current of 175 uA. LiF and TiD1.5 are both thin film depositions (solids) onto a tantalum backing.

In certain embodiments, integrated control systems are employed with the neutron generating systems herein, which include independent safety and/or control systems. In certain embodiments, software components are included with the control systems to allow changes to be made in the made to accommodate different targets that are swapped in and out. In certain embodiments, the software controls fully automate the system, allowing an operator to select a particular ion beam target and the system automatically compensates for the needed distance to target of the ion beam, and strength of ion beam.

FIG. 1 shows an exemplary schematic of an accelerator system installed in a testing facility. In this Figure part 10 shows a neutron-producing target assembly, part 20 shows a high energy beam transport assembly, part 30 shows an ion beam accelerator, and part 40 shows low energy beam transport assembly. Also in this Figure, part 50 shows an ion source, part 60 shows an auxiliary control cabinet, part 70 shows radiation shielding, and part 80 shows radiation shielding.

Figure 2:
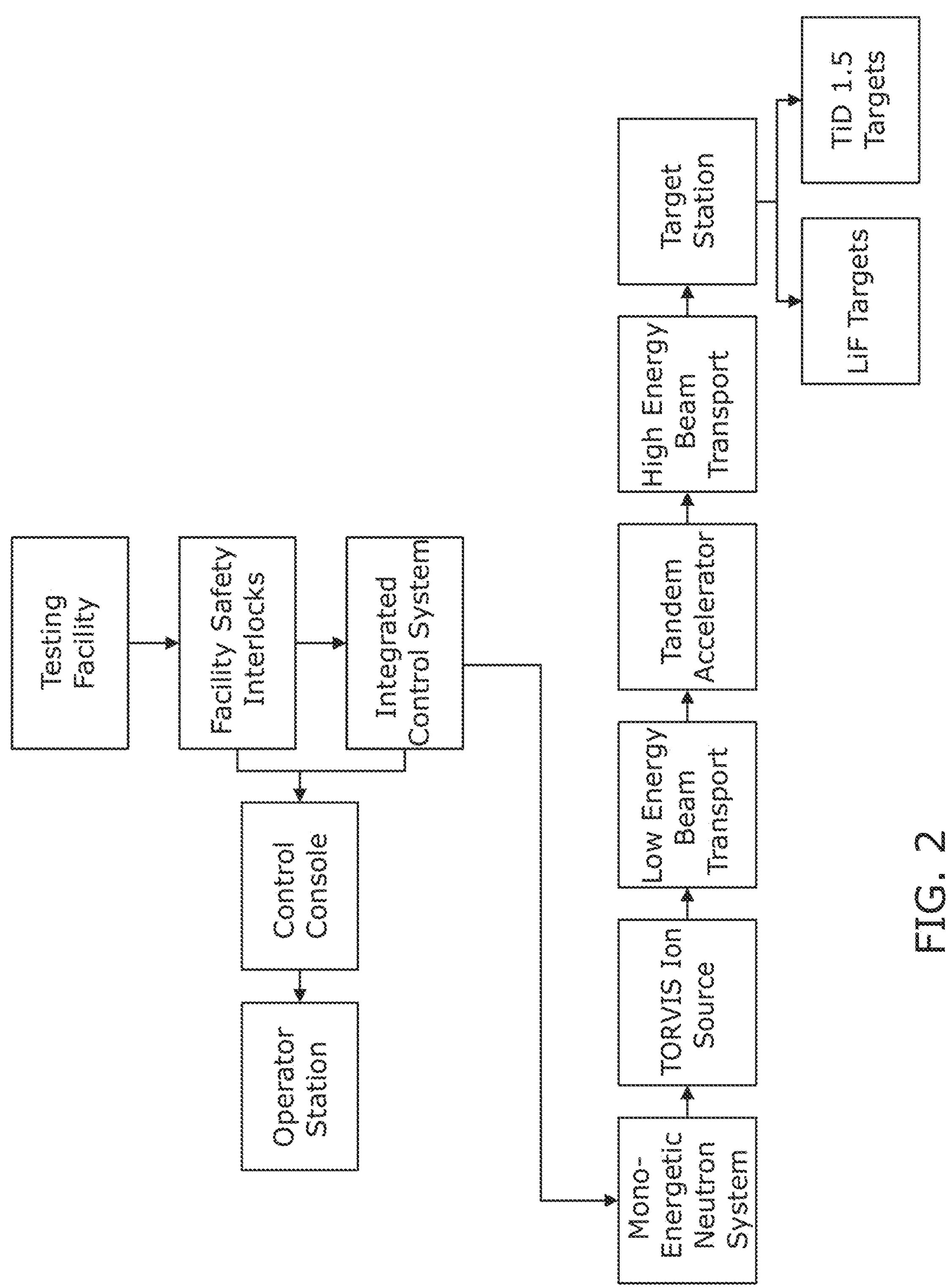
FIG. 2 shows an exemplary box diagram of an accelerator system, testing facility, and control components.

FIG. 2 shows an exemplary box diagram of an accelerator system, testing facility, and control components. As shown in this figure, a mono-energetic neutron system is composed of the following components: an ion source (e.g., TORVIS ion source), a low energy beam transport component, an accelerator (e.g., tandem accelerator), a high energy beam transport, and a target station. The target station may, for example, be configured to LiF and TiD1.5 targets. Also shown in this figure is an integrated control system that controls all of the aforementioned components. The integrated control system is controlled by an operator that interacts with the system via a control console at an operator station.

FIG. 3 shows an exemplary portion of an accelerator system that includes a target station. This figure shows a beam (arrow) coming from a focusing and steering station, past a turbo pump, valve (e.g., VAT series 750 high speed accelerator isolation valve), then entering a target chamber with a collimator (e.g., four finger collimator with calorimetry and current measurement systems) and a target (e.g., one of a plurality of swappable targets).

FIG. 4A shows an exemplary embodiment where a beam dump intercepts the beam line in a target chamber such that it cannot then strike the target. FIG. 4B shows how the beam dump is able to retract and allow the beam to continue to a collimator and target. The beam dump is water cooled. When the beam is caught by the beam dump, it can be measured by the collimator (e.g., 4-finger collimator).

FIG. 5 shows a cut-away view of an exemplary target station. A collimator is shown (e.g., 4-finger collimator) prior to the target.

FIG. 6 shows a top view (6A) and cut-away view (6B) of an exemplary target holding flange for use in the systems herein. The outer ring ConFlat has alignment pins and may be composed of stainless steel. The conflat flange may, for example, be composed of explosively bonded stainless steel to aluminum. The target is attached to and held rigidly in place by its water cooling lines that are vacuum coupling radiation (VCR) type fittings.

Figure 7:
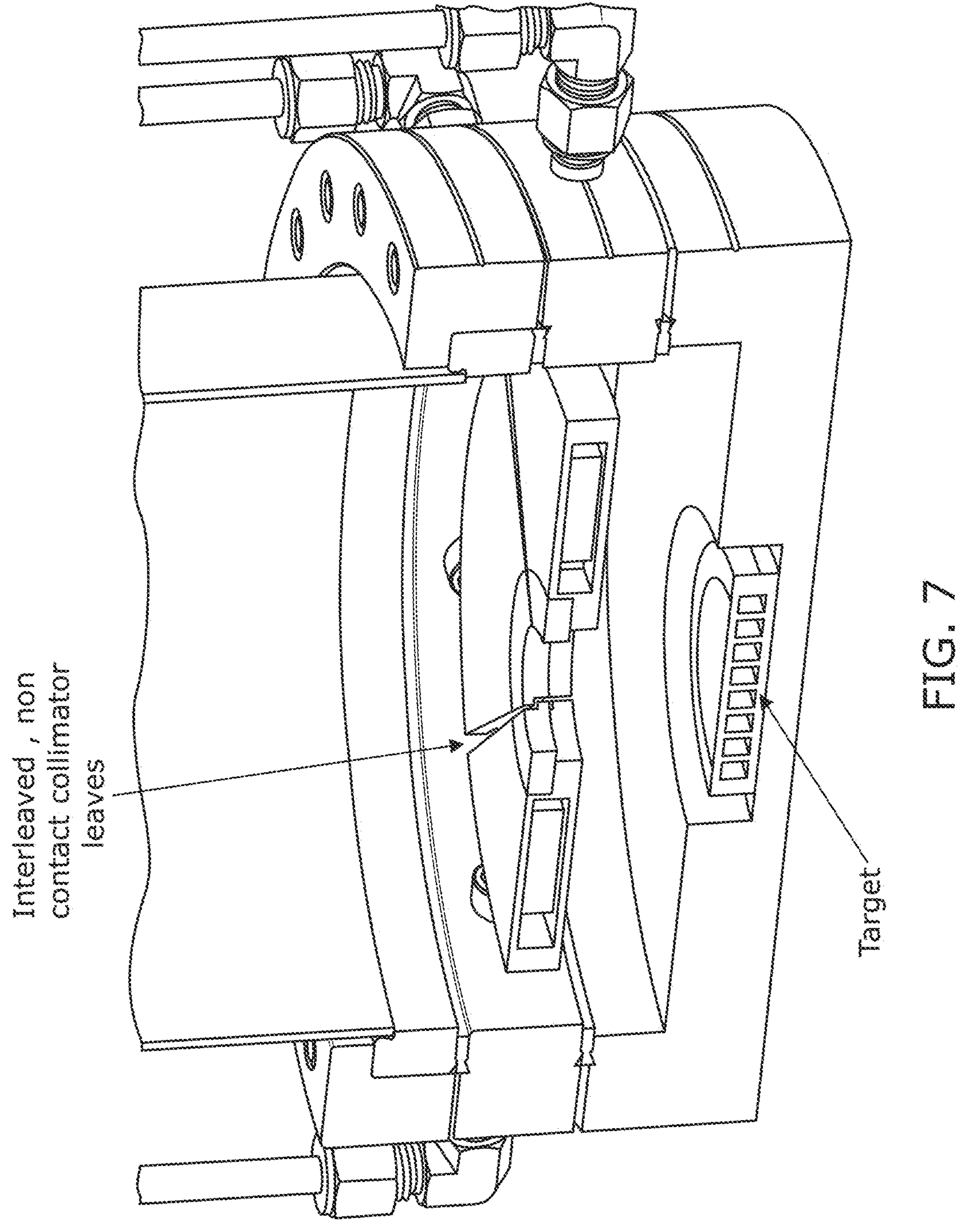
FIG. 7 shows a cut away of an exemplary target station.

FIG. 7 shows a cut away of an exemplary target station. In this figure, an interleaved, non-contact collimator leaves are shown above an ion beam target.

Figure 8:
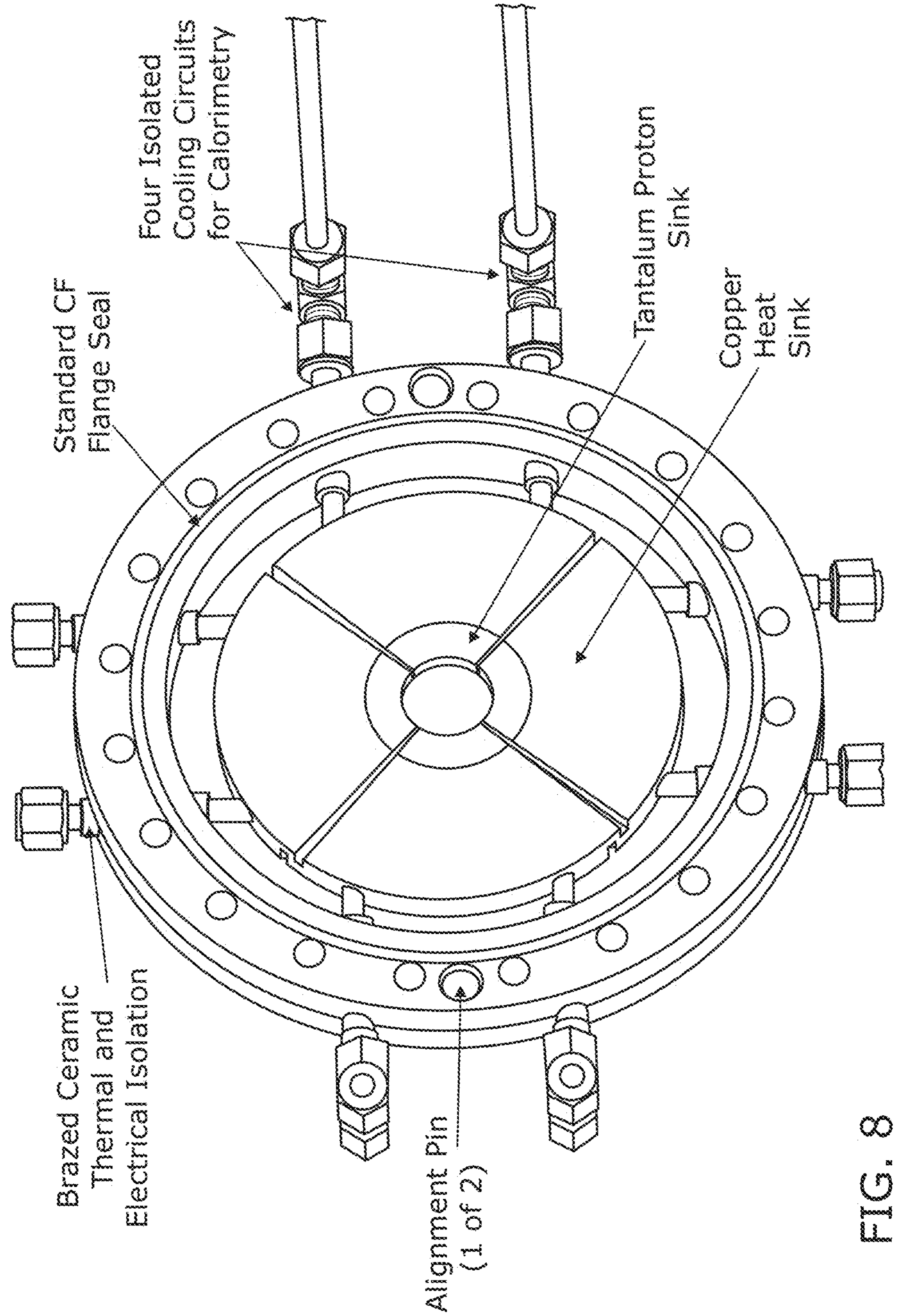
FIG. 8 shows an exemplary four finger collimator and holding mechanism.
Figure 9:
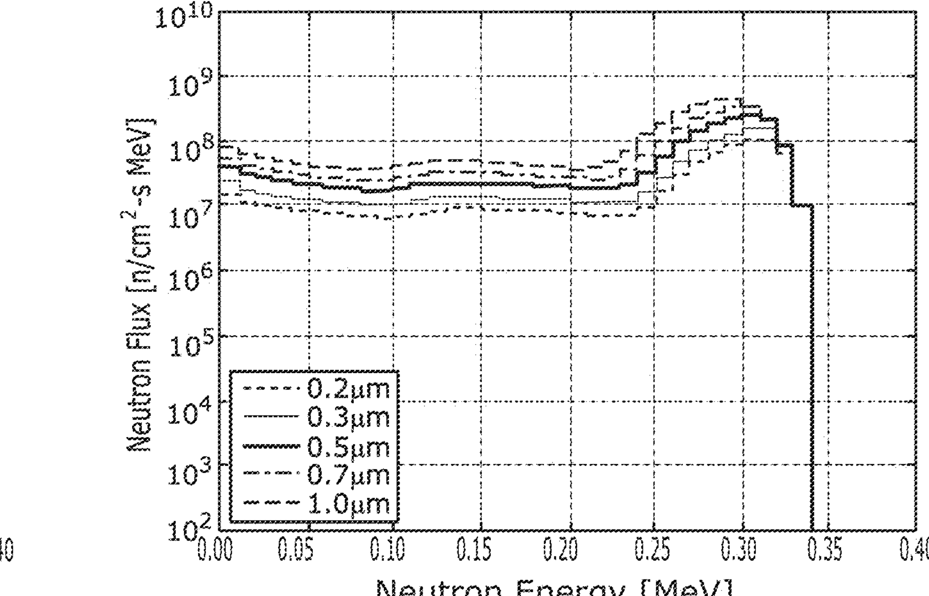
FIG. 9 shows neutron energy spectra target modeling for 2 cm from a p-LiF target at 300 keV, showing the flux to energy relationship for different target thicknesses.
Figure 10:
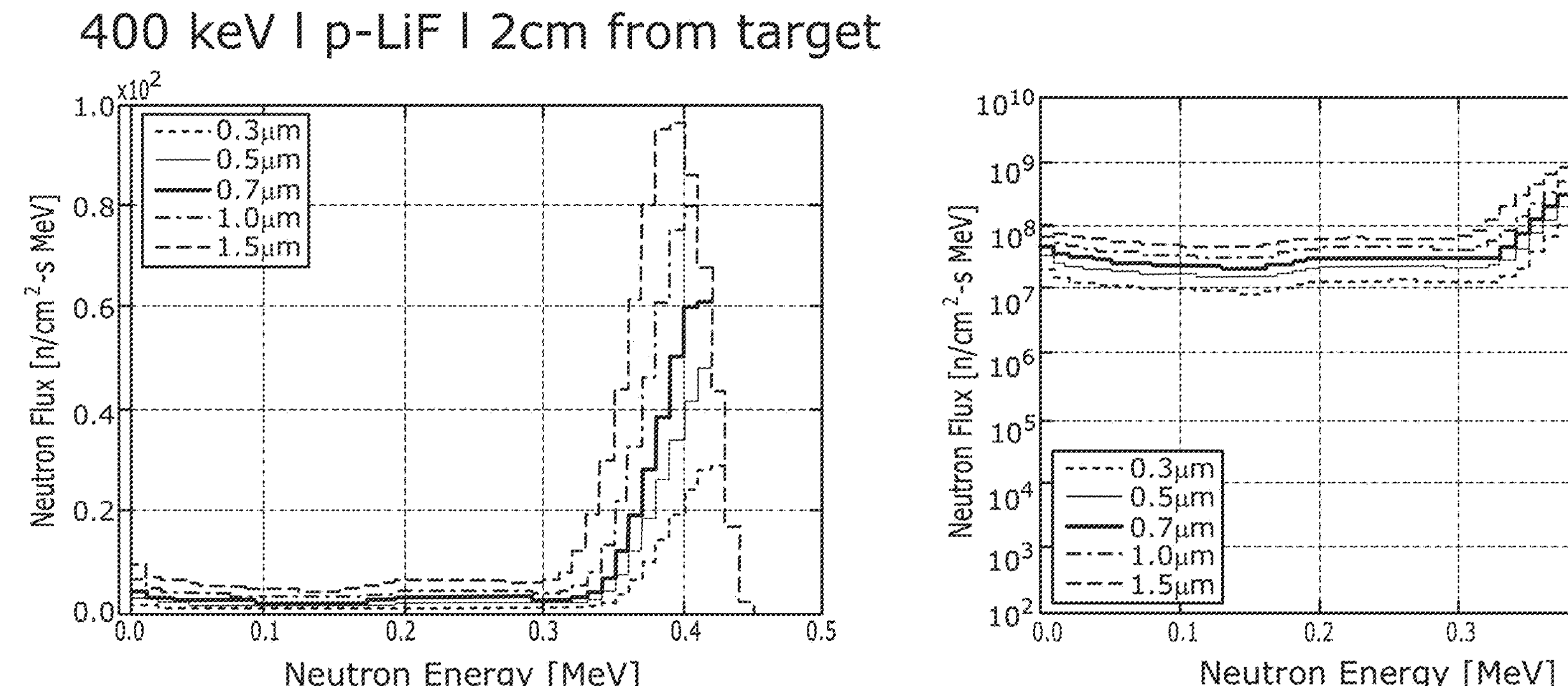
FIG. 10 shows neutron energy spectra target modeling for 2 cm from a p-LiF target at 400 keV, showing the flux to energy relationship for different target thicknesses.
Figure 11:
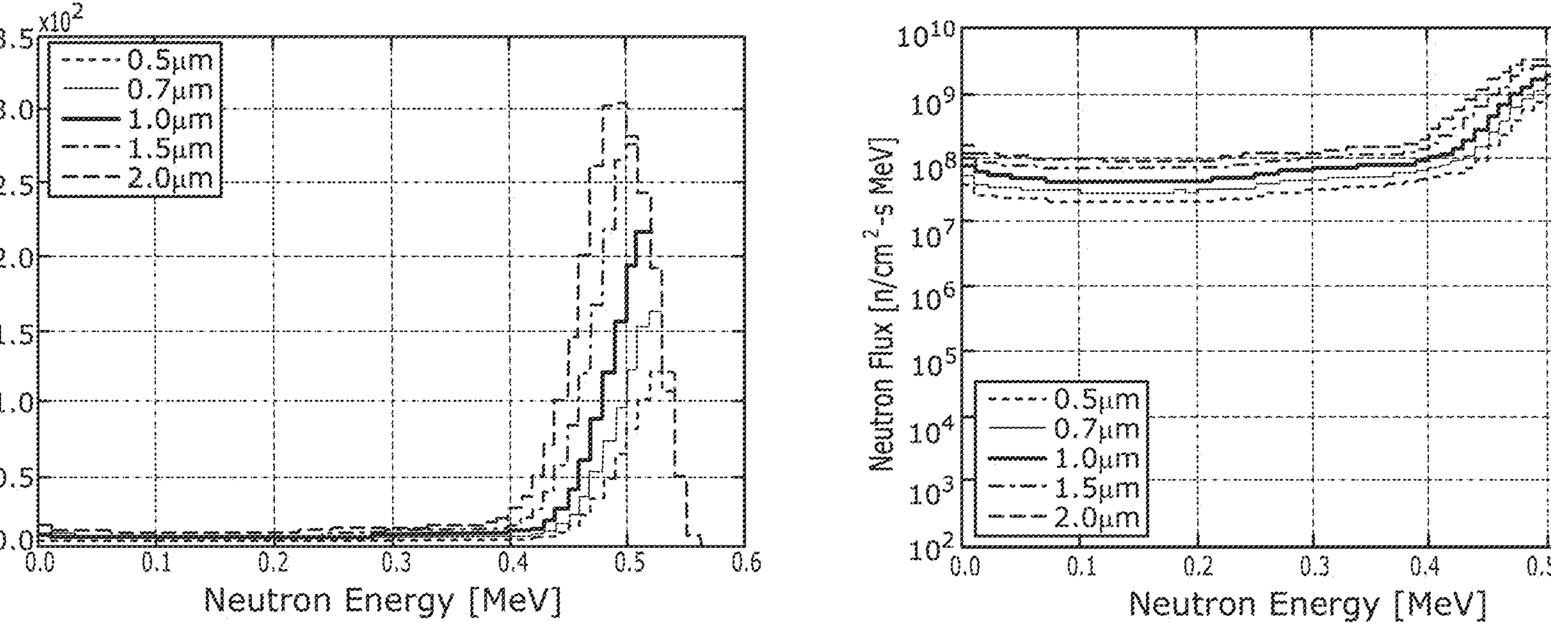
FIG. 11 shows neutron energy spectra target modeling for 2 cm from a p-LiF target at 500 keV, showing the flux to energy relationship for different target thicknesses.
Figure 12:
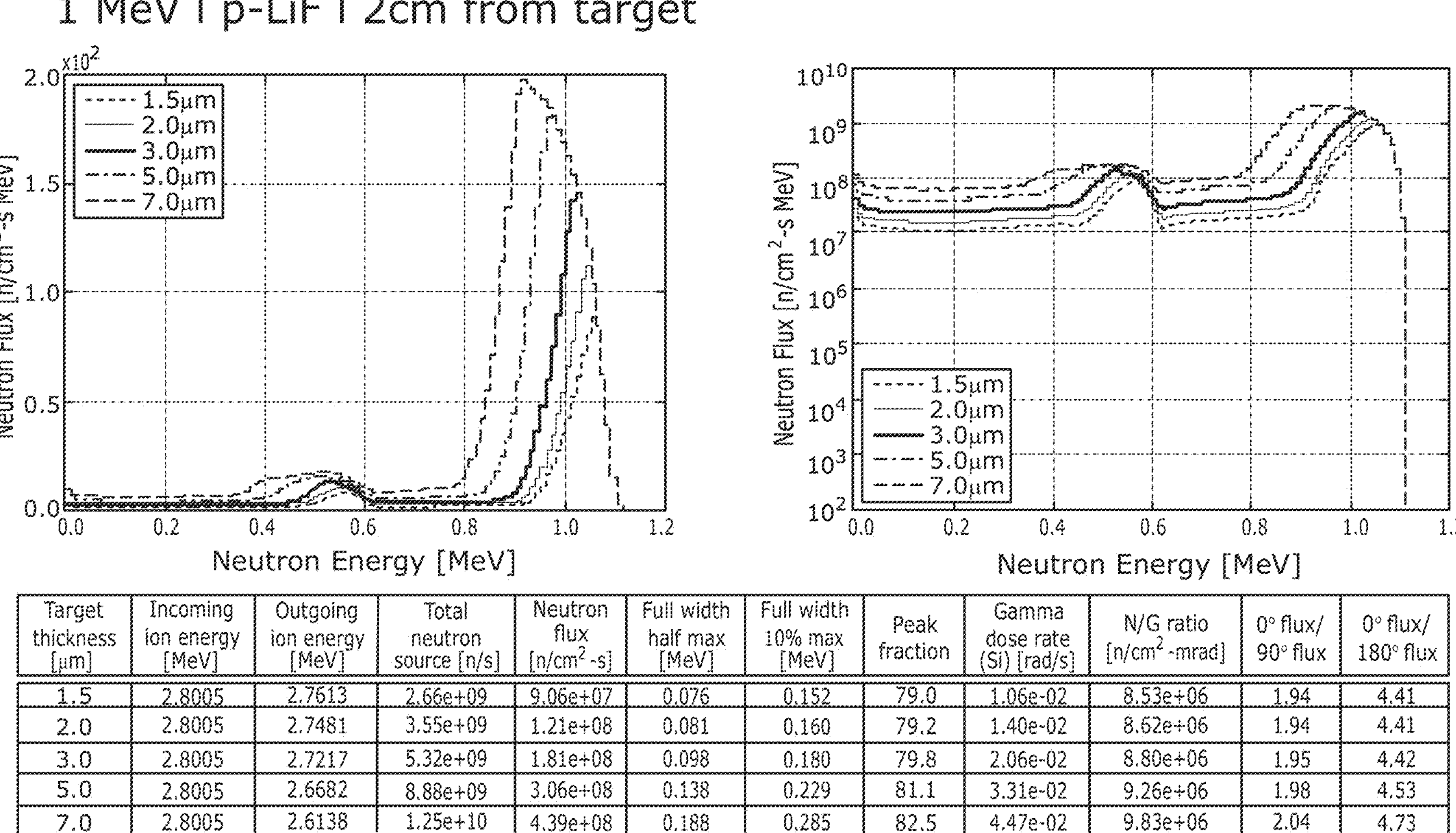
FIG. 12 shows neutron energy spectra target modeling for 2 cm from a p-LiF target at 1 MeV, showing the flux to energy relationship for different target thicknesses.
Figure 14:
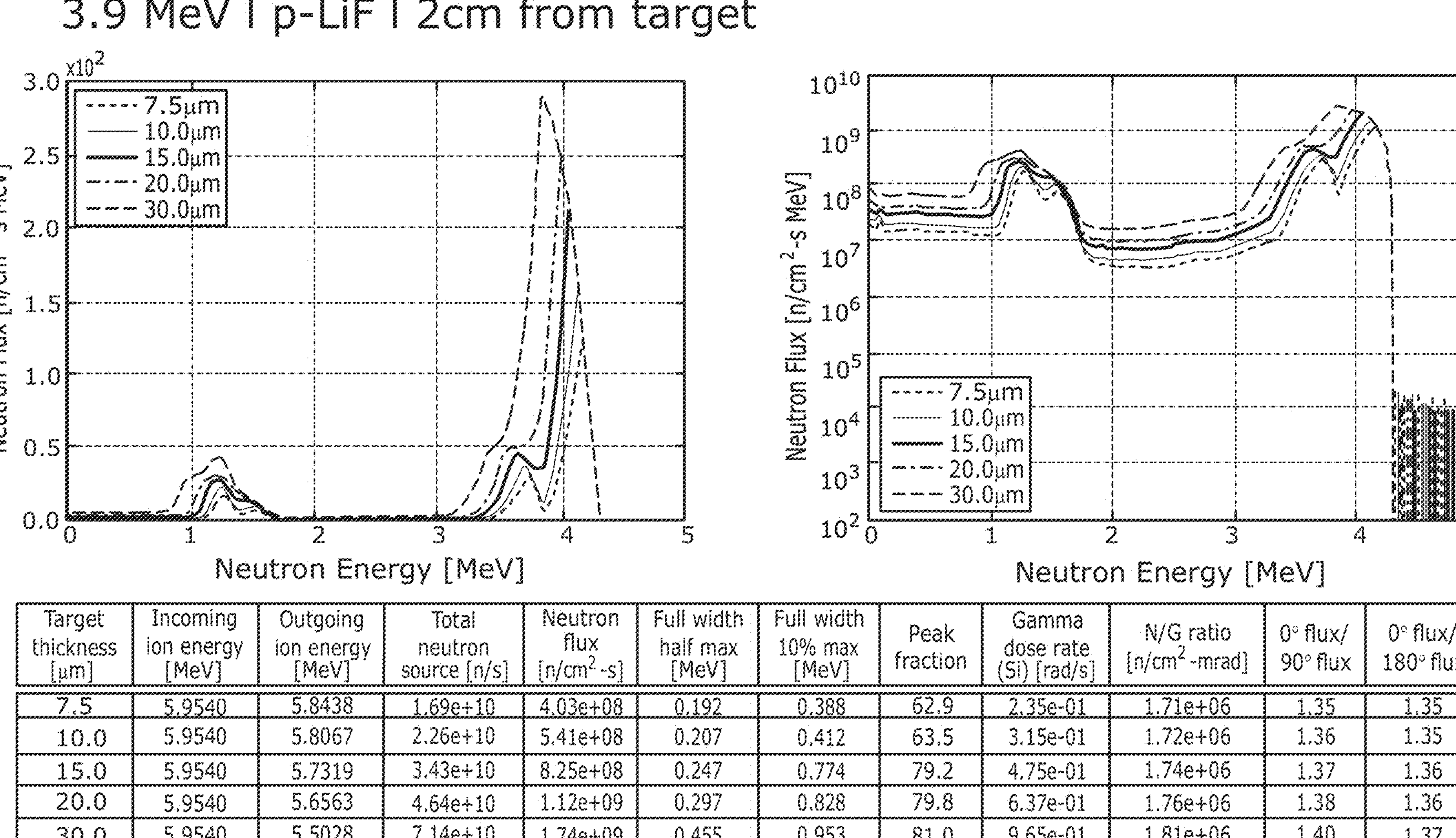
FIG. 14 shows neutron energy spectra target modeling for 2 cm from a p-LiF target at 3.9 MeV, showing the flux to energy relationship for different target thicknesses.
Figure 15:
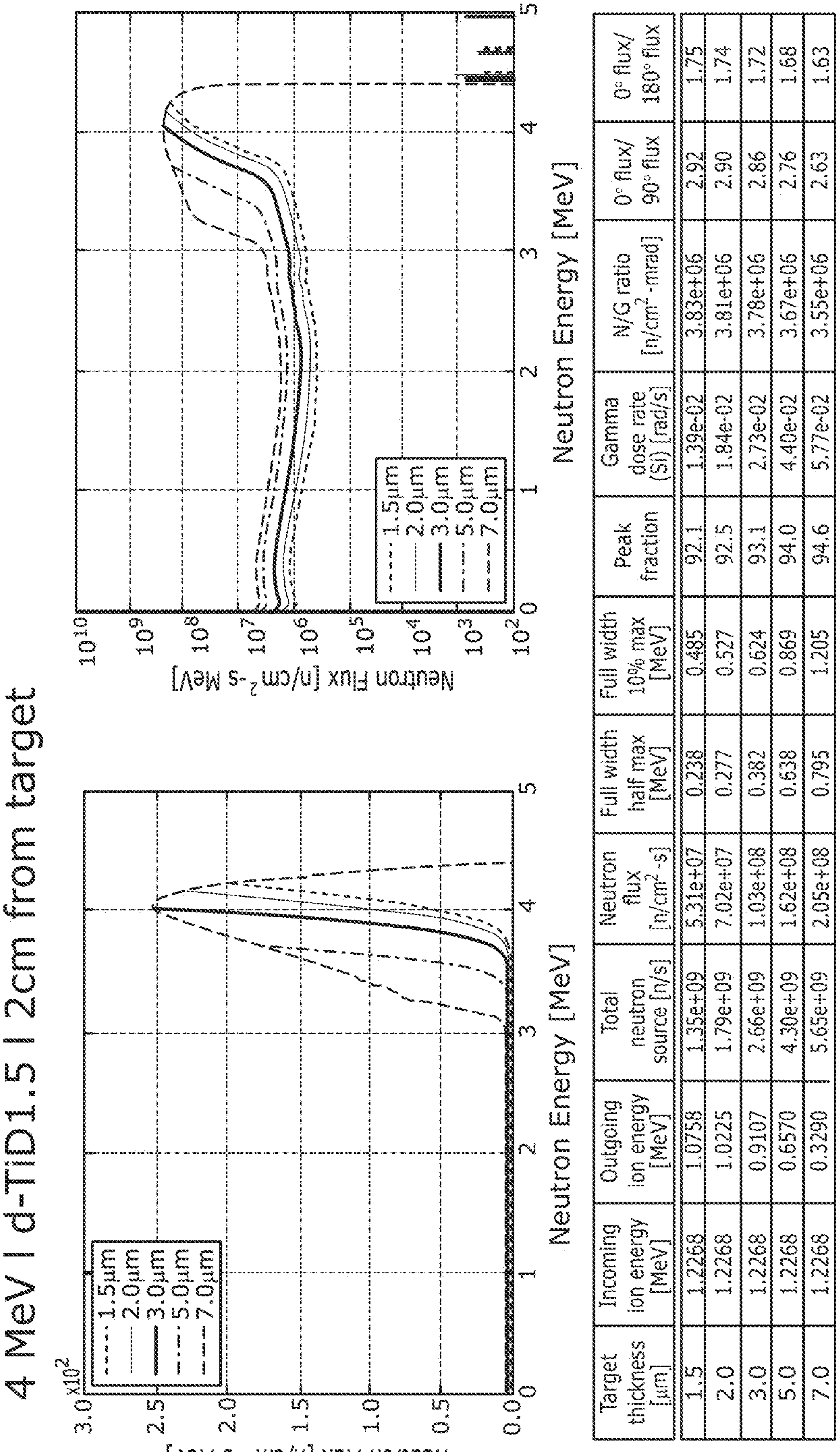
FIG. 15 shows neutron energy spectra target modeling for 2 cm from a d-TiD1.5 target at 4 MeV, showing the flux to energy relationship for different target thicknesses.
Figure 16:
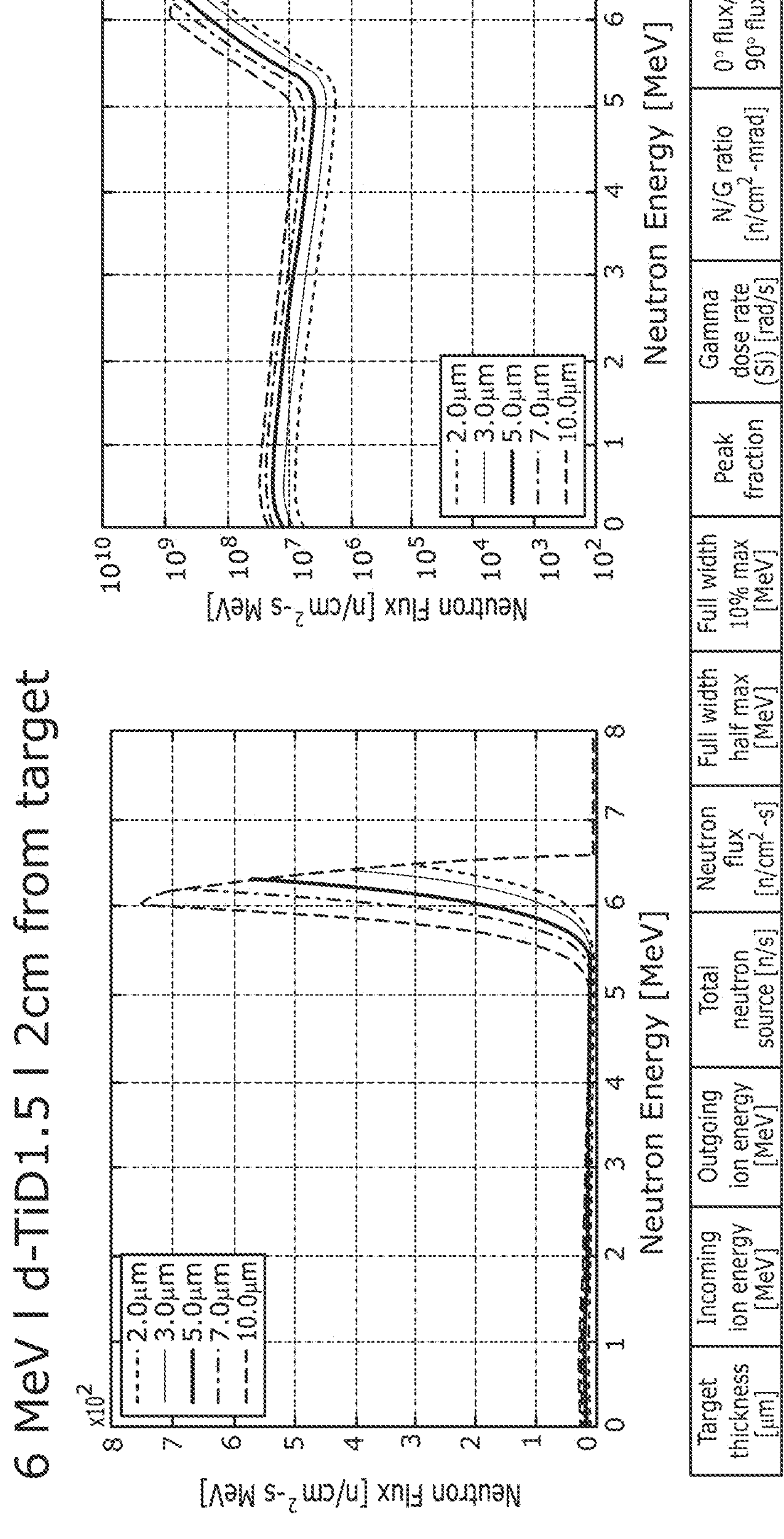
FIG. 16 shows neutron energy spectra target modeling for 2 cm from a d-TiD1.5 target at 6 MeV, showing the flux to energy relationship for different target thicknesses.
Figure 17:
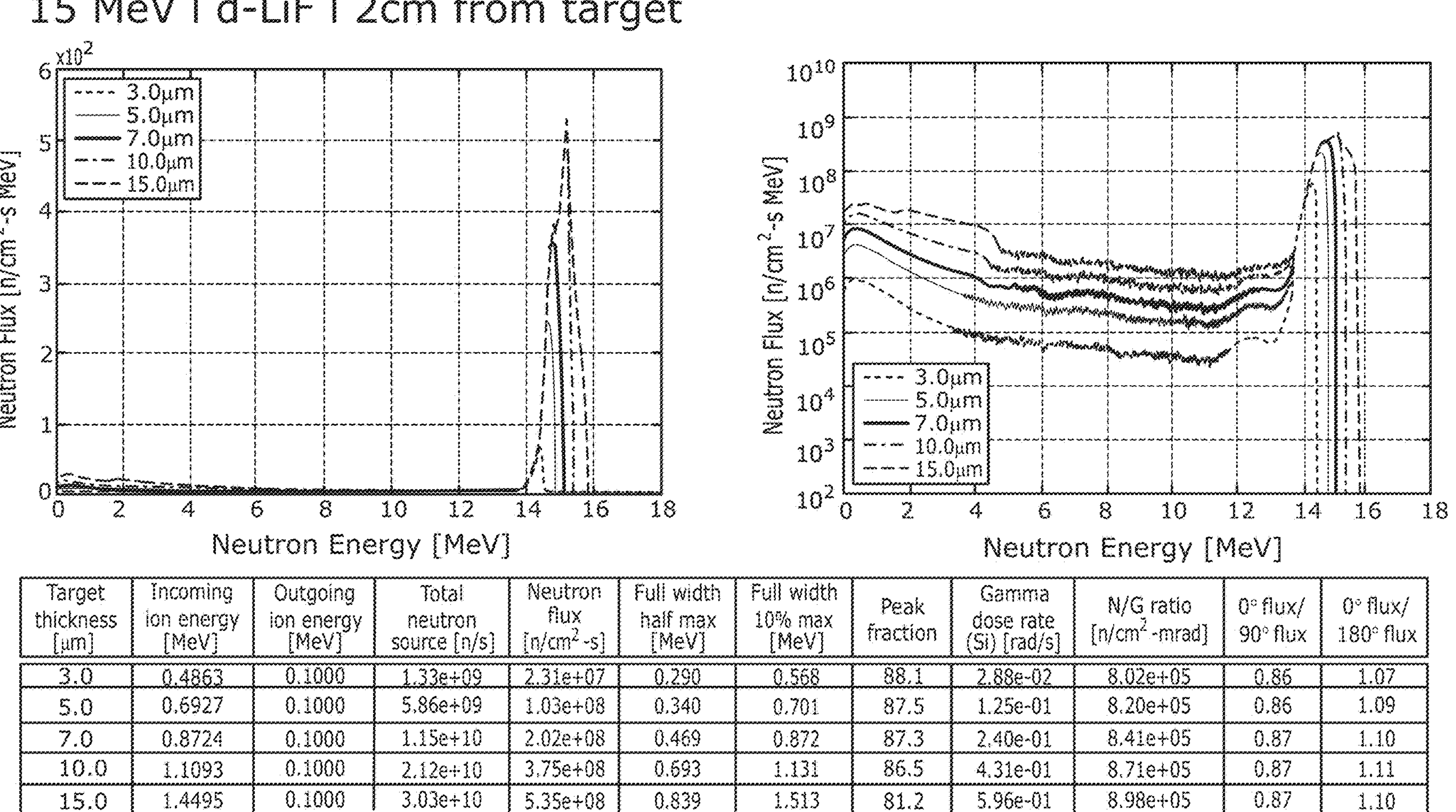
FIG. 17 shows neutron energy spectra target modeling for 2 cm from a d-LiF target at 15 MeV, showing the flux to energy relationship for different target thicknesses.
Figure 18:
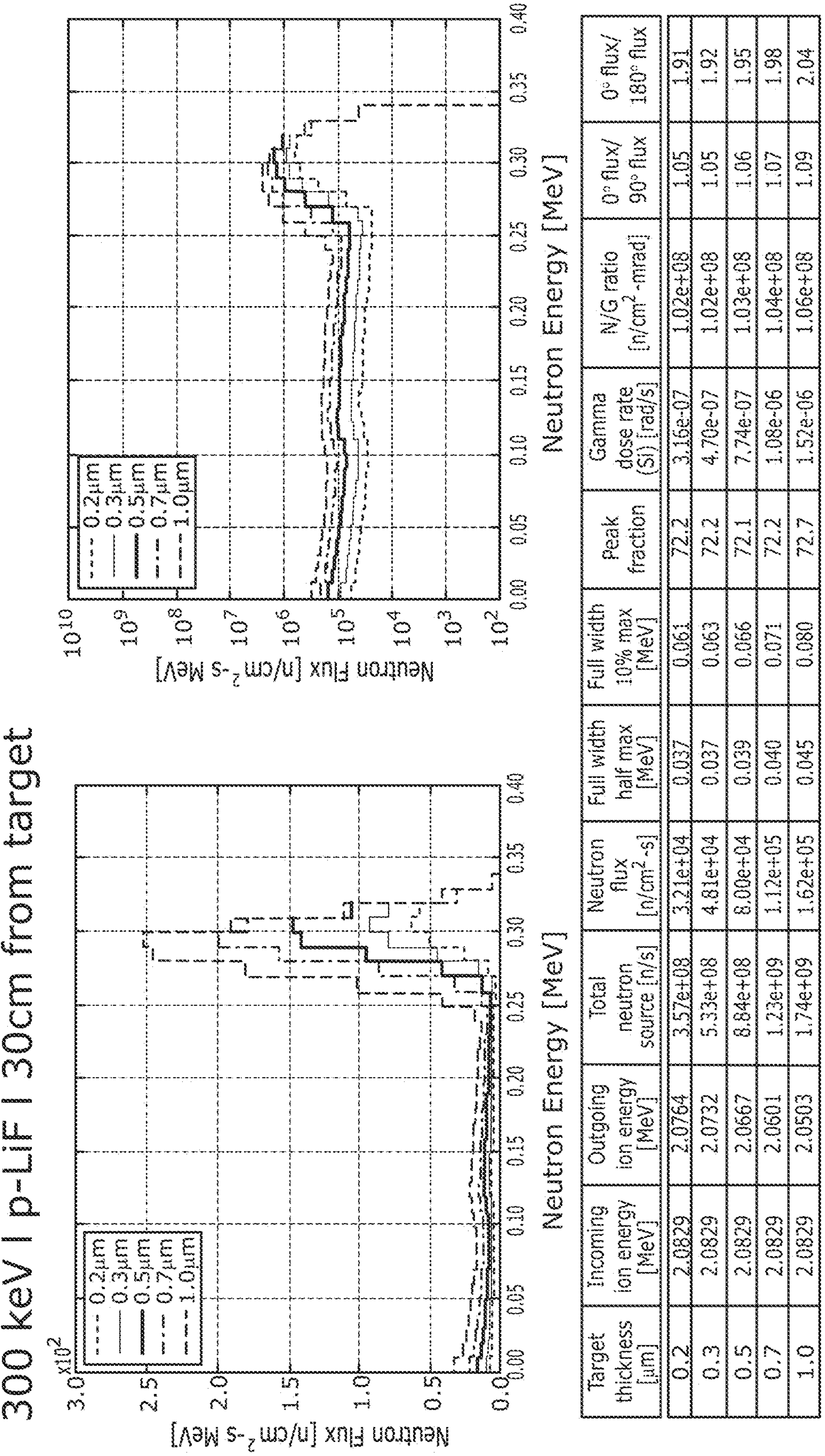
FIG. 18 shows neutron energy spectra target modeling for 30 cm from a p-LiF target at 300 keV, showing the flux to energy relationship for different target thicknesses.
Figure 19:
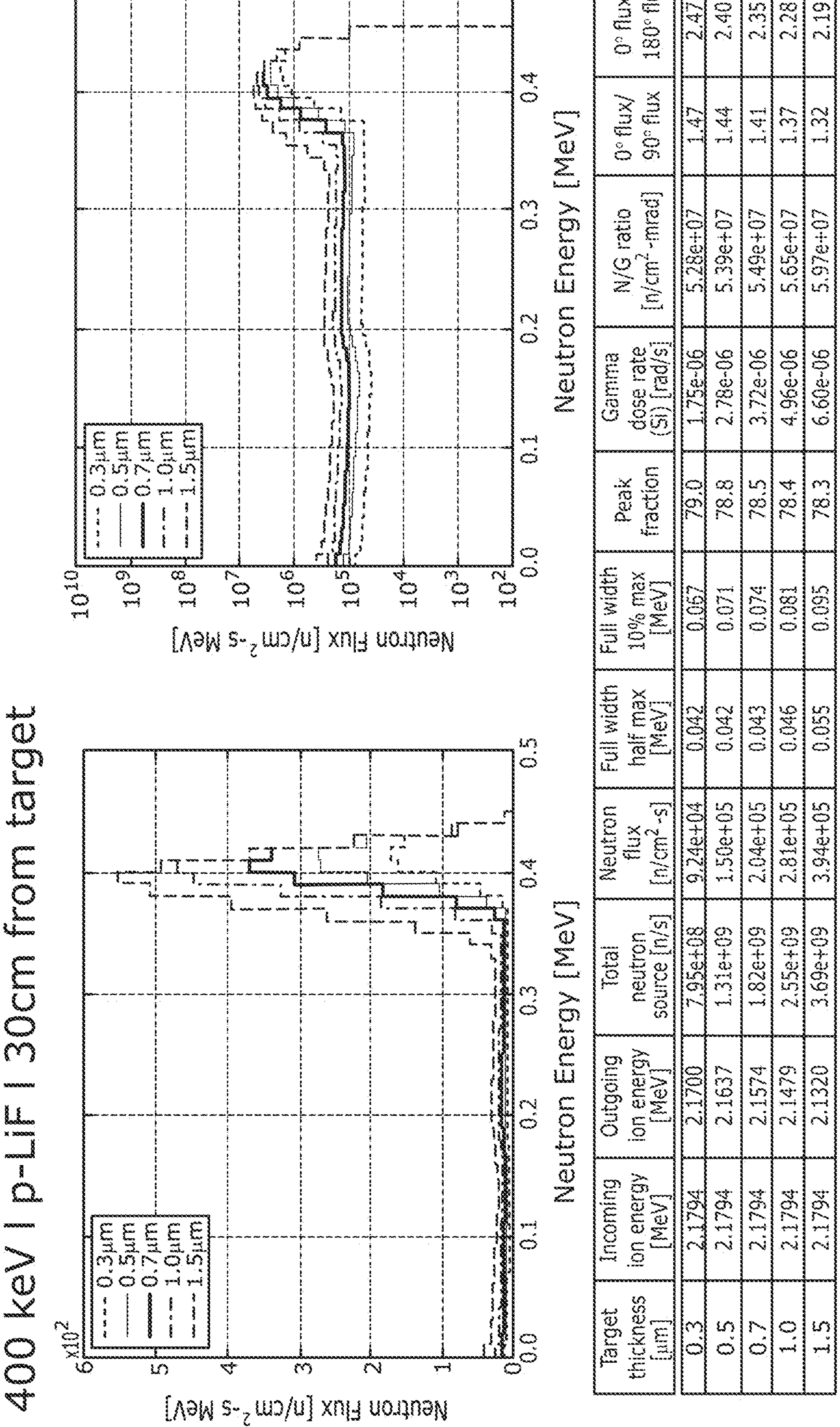
FIG. 19 shows neutron energy spectra target modeling for 30 cm from a p-LiF target at 400 keV, showing the flux to energy relationship for different target thicknesses.
Figure 20:
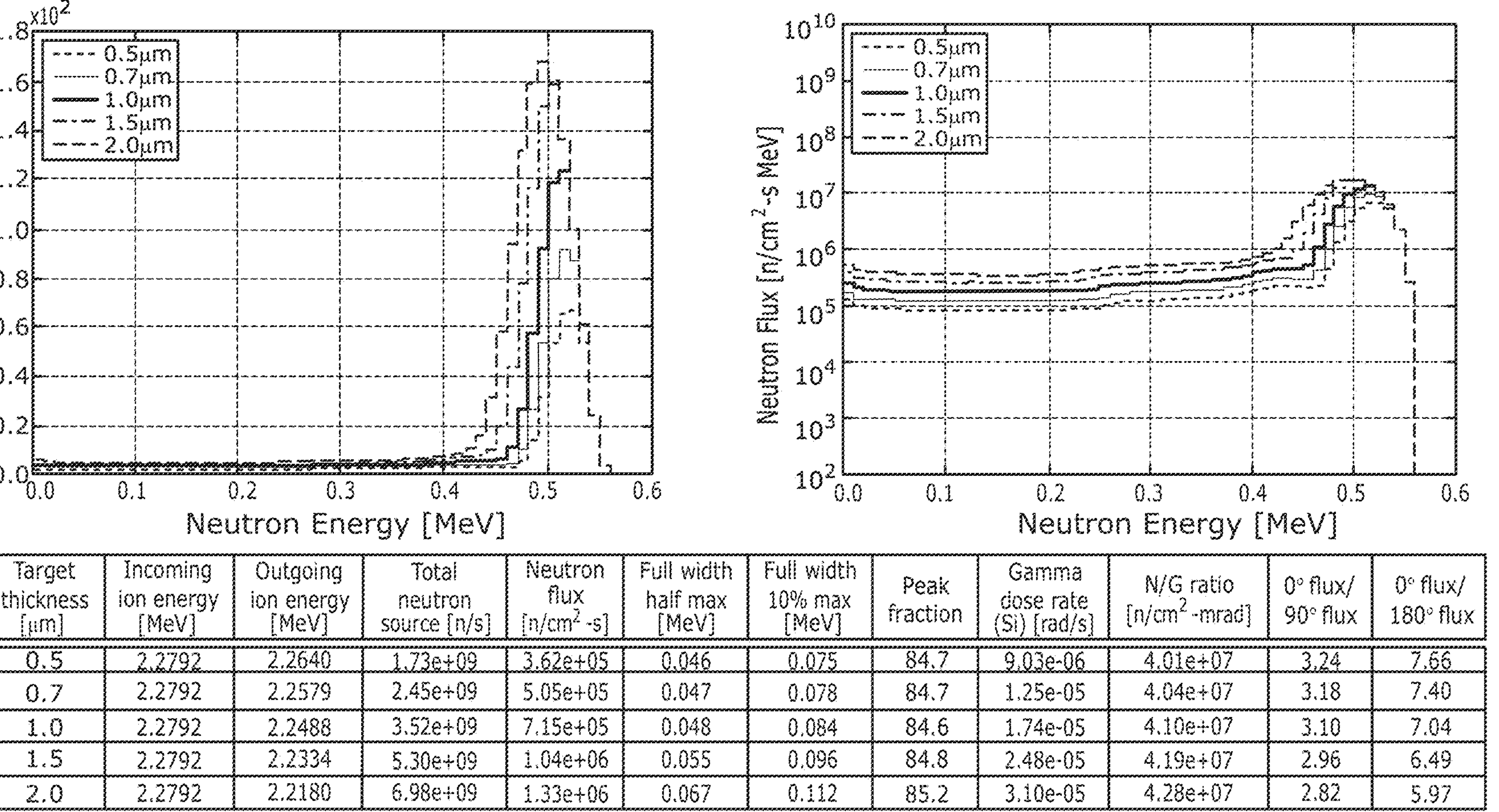
FIG. 20 shows neutron energy spectra target modeling for 30 cm from a p-LiF target at 500 keV, showing the flux to energy relationship for different target thicknesses.
Figure 21:
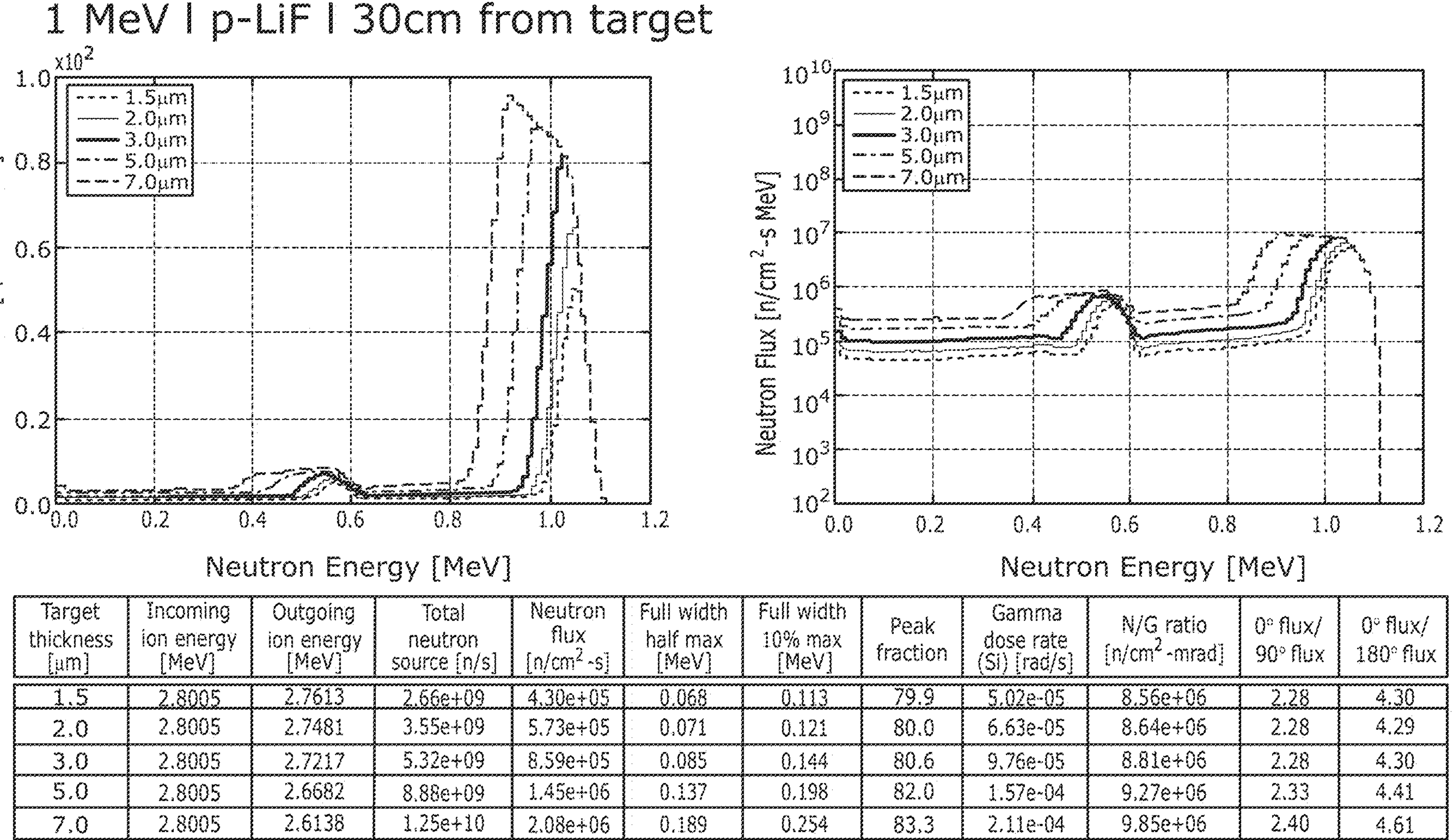
FIG. 21 shows neutron energy spectra target modeling for 30 cm from a p-LiF target at 1 MeV, showing the flux to energy relationship for different target thicknesses.
Figure 22:
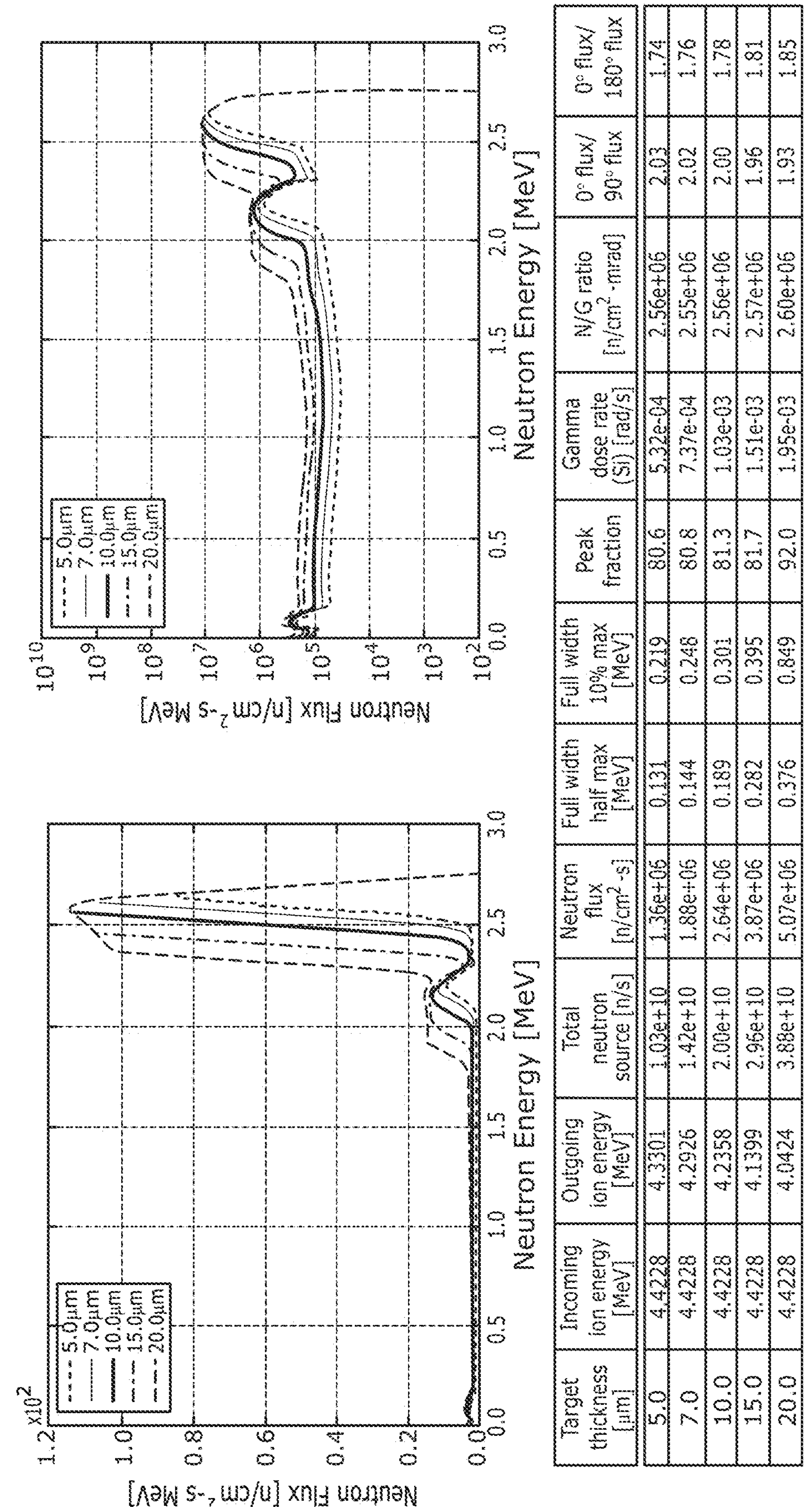
FIG. 22 shows neutron energy spectra target modeling for 30 cm from a p-LiF target at 2.5 MeV, showing the flux to energy relationship for different target thicknesses.
Figure 23:
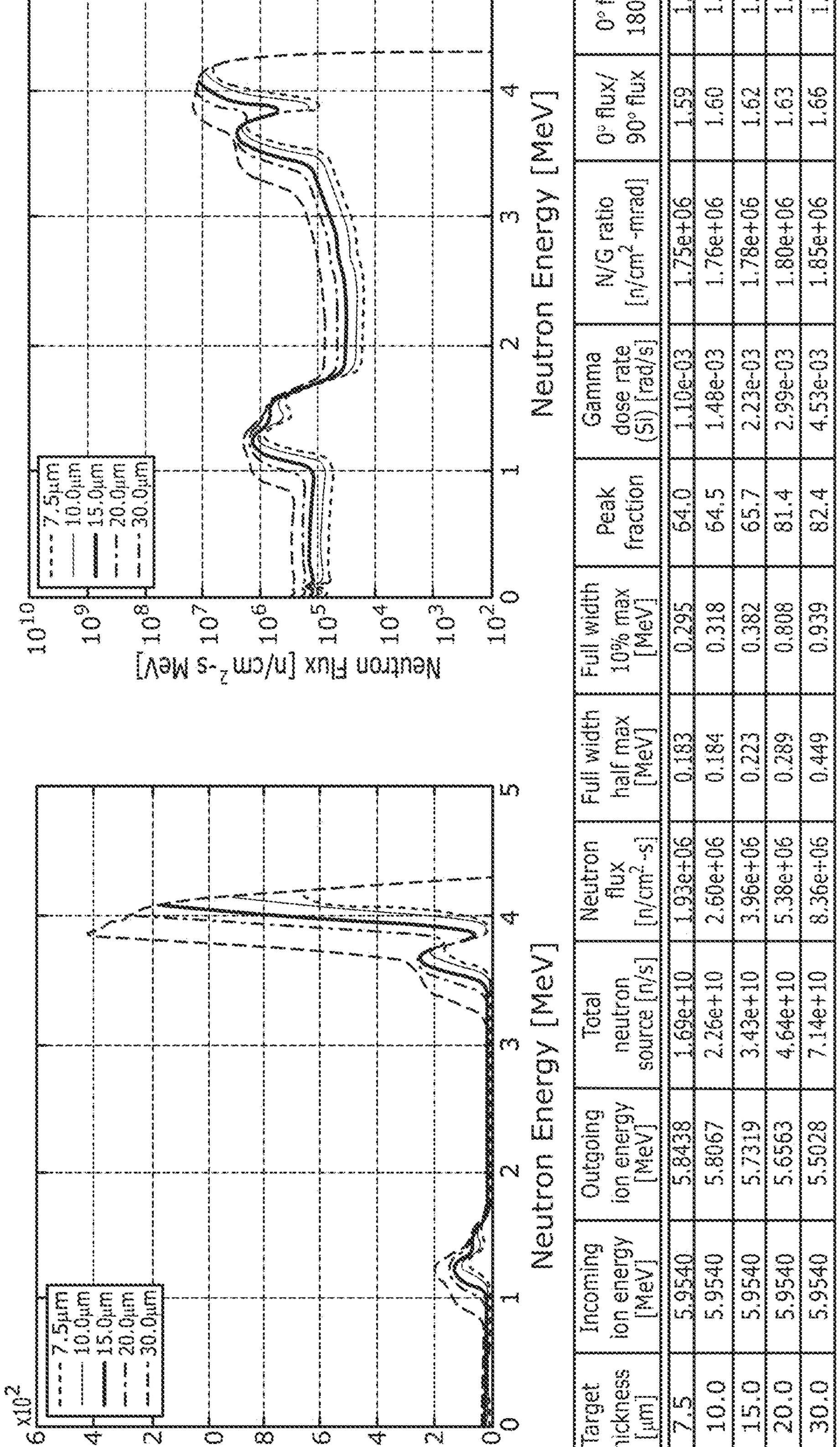
FIG. 23 shows neutron energy spectra target modeling for 30 cm from a p-LiF target at 3.9 MeV, showing the flux to energy relationship for different target thicknesses.
Figure 24:
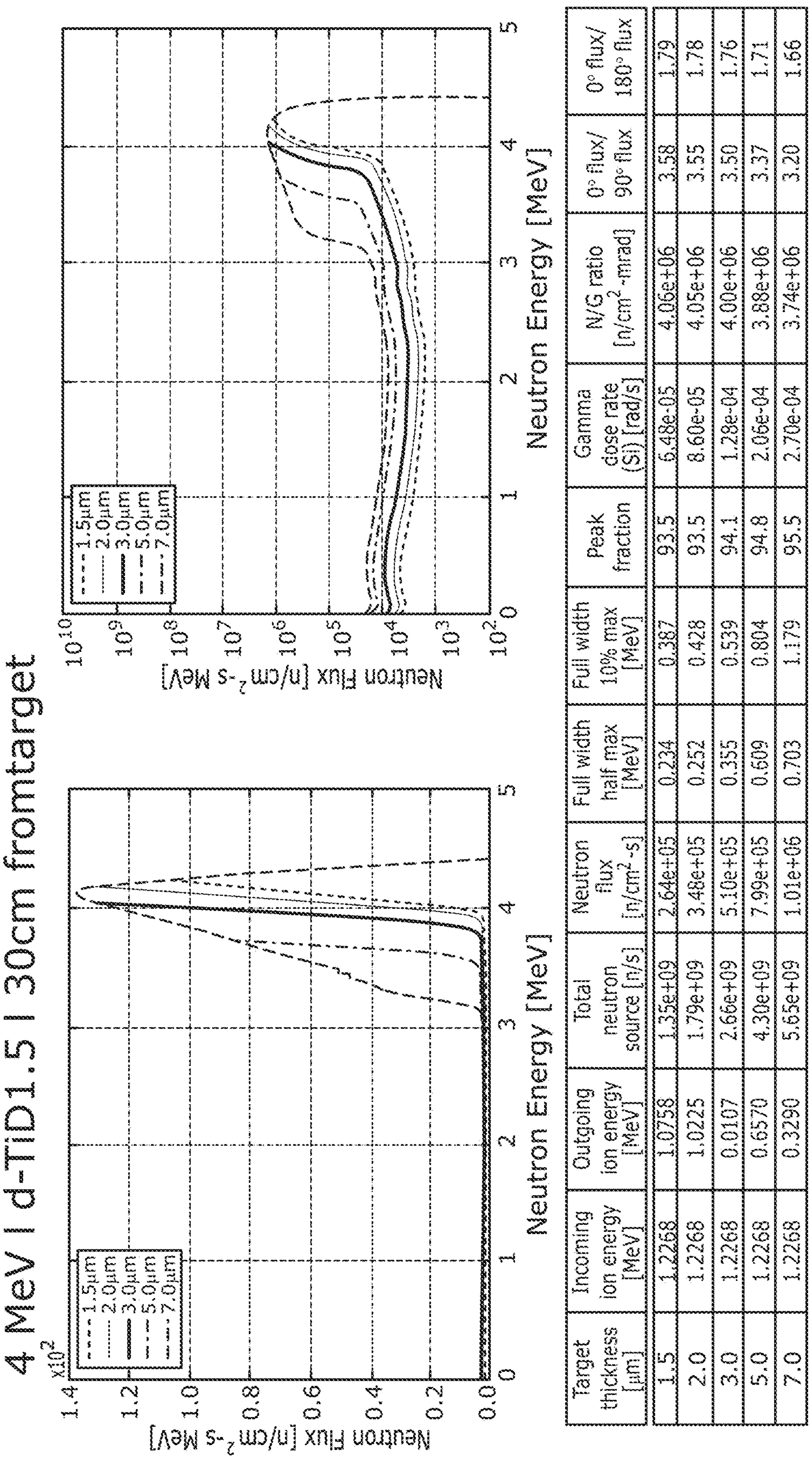
FIG. 24 shows neutron energy spectra target modeling for 30 cm from a d-TiD1.5 target at 4 MeV, showing the flux to energy relationship for different target thicknesses.
Figure 25:
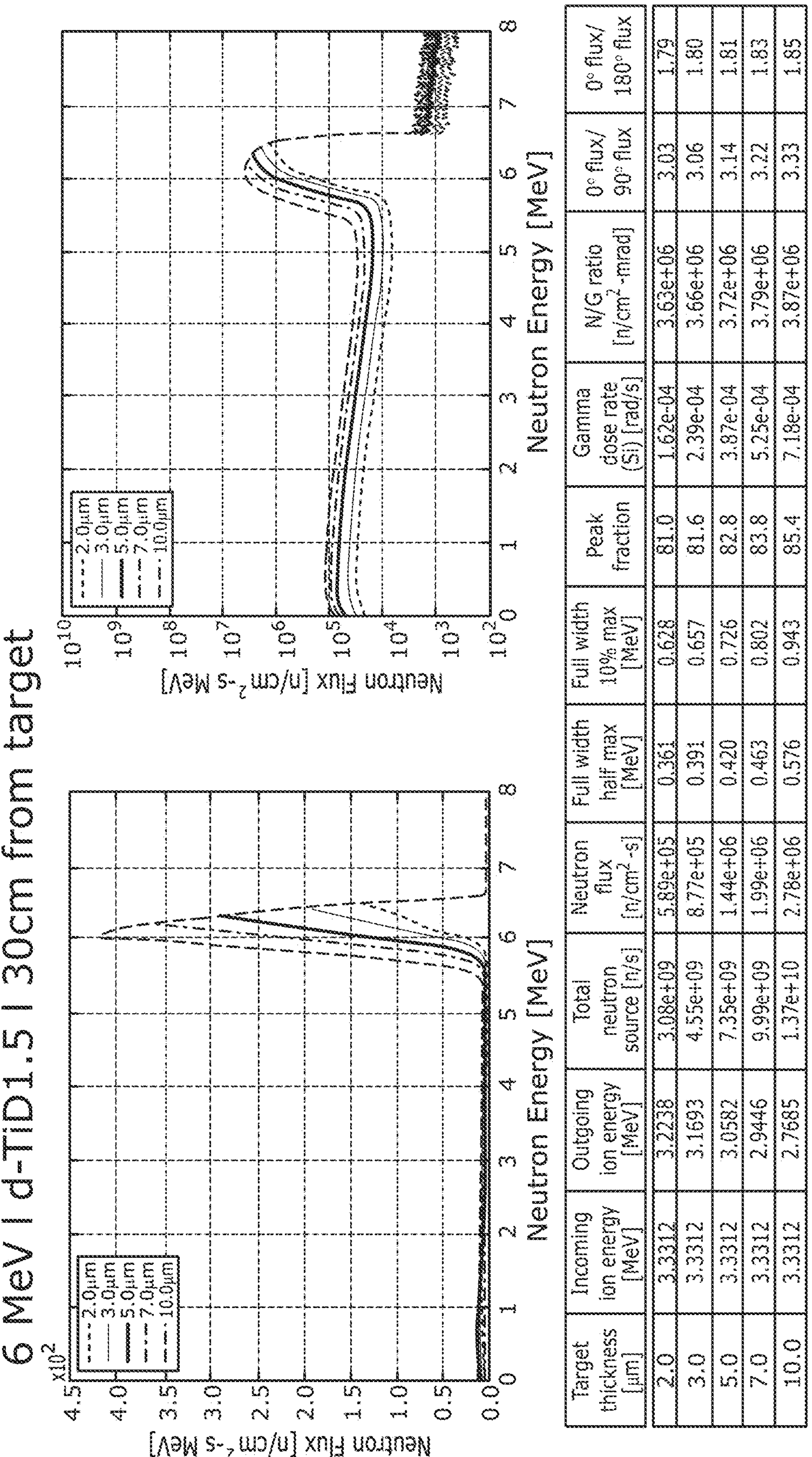
FIG. 25 shows neutron energy spectra target modeling for 30 cm from a d-TiD1.5 target at 6 MeV, showing the flux to energy relationship for different target thicknesses.
Figure 26:
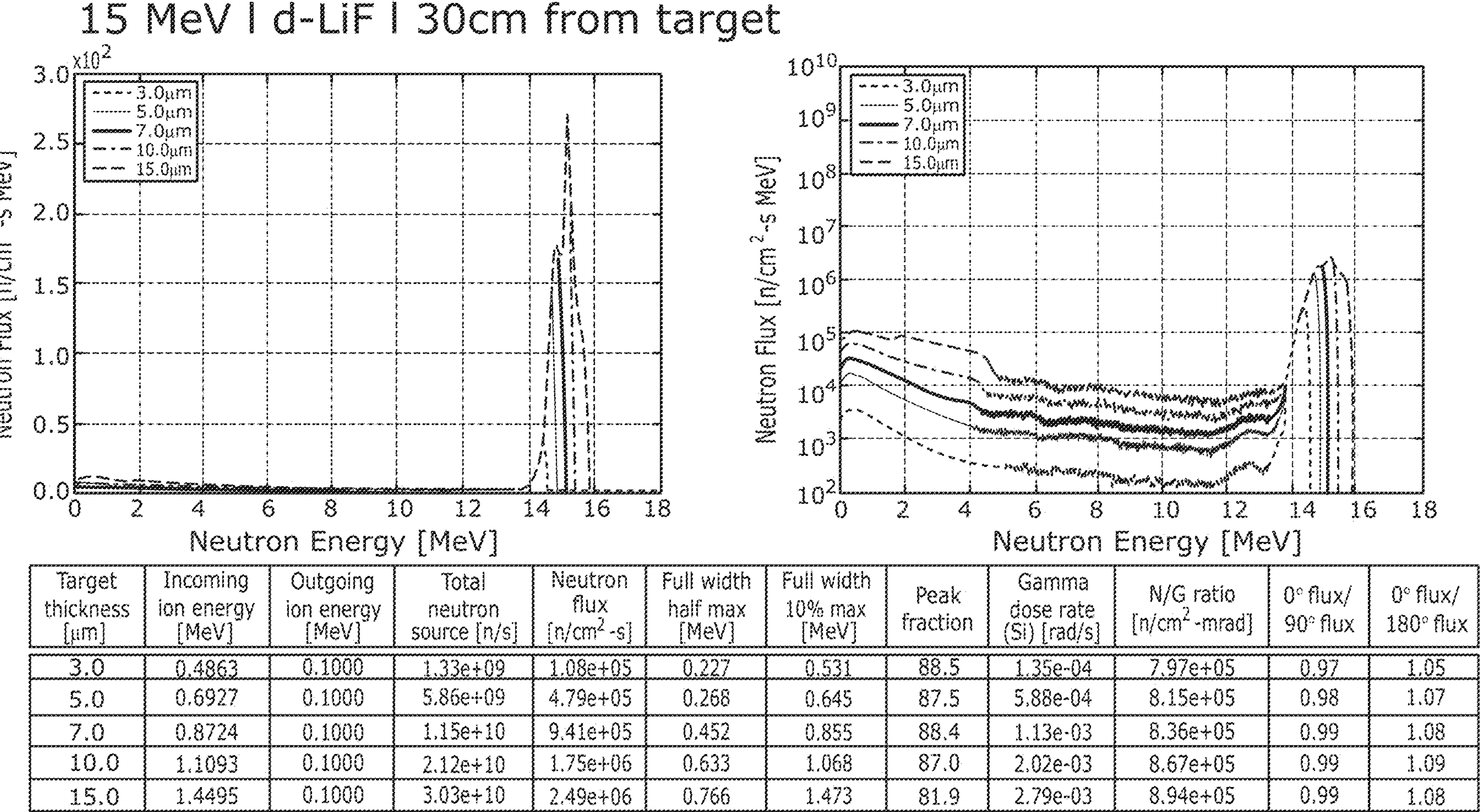
FIG. 26 shows neutron energy spectra target modeling for 30 cm from a d-LiF target at 15 MeV, showing the flux to energy relationship for different target thicknesses.

FIG. 8 shows an exemplary four finger collimator and holding mechanism. The connections of the holding mechanism may be brazed ceramic for thermal and electrical isolation. A standard CF flange seal is shown, along with four isolated cooling circuits for calorimetry, and a pair of alignment pins. The four finger collimator is shown with a central tantalum proton sink and outer copper heat sink.

All publications and patents provided herein incorporated by reference in their entireties. Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

We claim:

1. A collimator configured to receive an ion beam, the collimator comprising:

a plurality of fingers collectively forming an annulus having a central opening, wherein each finger of the plurality of fingers comprises: a proton sink positioned at an inner perimeter of the annulus, radially adjacent the central opening; and a heat sink positioned at an outer perimeter of the annulus; wherein each of the plurality of fingers is wedge shaped; and a plurality of cooling circuits; wherein each of the plurality of cooling circuits is integrated inside a respective one of the plurality of fingers;

wherein each of the plurality of cooling circuits is isolated from the other of the plurality of cooling circuits and configured to perform calorimetry.

2. The collimator of claim 1, wherein each proton sink comprises tantalum.

3. The collimator of claim 1, wherein each heat sink comprises copper.

4. The collimator of claim 1, wherein the plurality of fingers comprises at least four fingers.

5. The collimator of claim 1, further comprising a current measurement system.

6. The collimator of claim 1, wherein the plurality of fingers is interleaved.

7. The collimator of claim 1, wherein adjacent ones of the plurality of fingers are not in contact with each other.

8. The collimator of claim 7, wherein adjacent ones of the plurality of fingers are circumferentially spaced apart from each other.

9. A method comprising:

directing an ion beam onto a collimator having a plurality of fingers collectively forming an annulus having a central opening, wherein a first portion of the ion beam strikes the collimator and a second portion of the ion beam passes through the central opening, and wherein each of the plurality of fingers comprises: a proton sink positioned at an inner perimeter of the annulus, radially adjacent the central opening; and a heat sink positioned at an outer perimeter of the annulus; wherein each of the plurality of fingers is wedge shaped; and wherein each of the plurality of cooling circuits is integrated inside a respective one of the plurality of fingers; wherein each of the plurality of cooling circuits is isolated from the other of the plurality of cooling circuits and configured to perform calorimetry; and measuring a beam current of the first portion of the ion beam using the collimator.

10. The method of claim 9, further comprising directing the second portion of the ion beam onto an ion beam target, thereby generating neutrons.

11. The method of claim 9, wherein the first portion of the ion beam strikes the proton sinks of the plurality of fingers.

12. The method of claim 10, wherein the ion beam target comprises LiF, $TiD_{1.5-1.8}$, $TiT_{1-2}$, $ErD_{1.5}$, ErT, or Li.

13. The method of claim 9, further comprising determining a beam current of the second portion of the ion beam.

14. The method of claim 9, further comprising, prior to directing the ion beam onto the collimator, directing the first portion and the second portion of the ion beam into a beam dump, measuring a total beam current of the ion beam using the beam dump, and retracting the beam dump away from a pathway of the ion beam.

15. The method of claim 14, further comprising determining a beam current of the second portion of the ion beam using the beam current of the first portion of the ion beam measured using the collimator and the total beam current of the ion beam measured using the beam dump.

16. The method of claim 9, wherein the proton sink comprises tantalum and the heat sink comprises copper.

17. The method of claim 9, wherein the plurality of fingers comprises at least four fingers.

18. The method of claim 9, wherein the collimator further comprises a current measurement system.

19. The method of claim 9, wherein the plurality of fingers is interleaved.

20. The method of claim 9, wherein adjacent ones of the plurality of fingers are not in contact with each other.

21. The collimator of claim 1, wherein each of the plurality of fingers further comprises the proton sink entirely positioned radially inward with respect to the heat sink.

22. The method of claim 9, wherein each of the plurality of fingers further comprises the proton sink entirely positioned radially inward with respect to the heat sink.

* * * * *